US012125438B2

(12) United States Patent
Wang et al.

(10) Patent No.: US 12,125,438 B2
(45) Date of Patent: Oct. 22, 2024

(54) PIXEL CIRCUIT, DRIVING METHOD, DISPLAY SUBSTRATE AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Zhu Wang, Beijing (CN); Zhenglong Yan, Beijing (CN); Ling Shi, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/905,251

(22) PCT Filed: Aug. 30, 2021

(86) PCT No.: PCT/CN2021/115319
§ 371 (c)(1),
(2) Date: Aug. 29, 2022

(87) PCT Pub. No.: WO2023/028754
PCT Pub. Date: Mar. 9, 2023

(65) Prior Publication Data

US 2024/0265865 A1 Aug. 8, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ......... G09G 3/3233; G09G 2300/0819; G09G 2300/0842; G09G 2300/0861;
(Continued)

(56) References Cited

U.S. PATENT DOCUMENTS

2007/0126667 A1 6/2007 Nakamura et al.
2018/0130412 A1 5/2018 Zhang et al.
(Continued)

FOREIGN PATENT DOCUMENTS

CN 103187024 A 7/2013
CN 103354079 A 10/2013
(Continued)

*Primary Examiner* — Andrew Sasinowski
(74) *Attorney, Agent, or Firm* — McCoy Russell LLP

(57) ABSTRACT

A pixel circuit includes a light-emitting element, a driving circuit, a compensation control circuit, a data writing-in circuit, a first reset circuit, a light-emitting control circuit and an energy storage circuit; the compensation control circuit controls to connect the control end and the first end of the driving circuit; the data writing-in circuit writes a data voltage into the second end of the driving circuit; the first reset circuit writes a reference voltage into the control end of the driving circuit under the control of a reset control signal; the energy storage circuit is electrically connected to the control end of the driving circuit and the first electrode of the light-emitting element, and is configured to store electrical energy; the driving circuit controls to connect the first end and the second end of the driving circuit under the control of the control end thereof.

20 Claims, 13 Drawing Sheets

(52) U.S. Cl.
CPC . *G09G 2300/0861* (2013.01); *G09G 2310/08* (2013.01); *G09G 2320/0223* (2013.01); *G09G 2320/0233* (2013.01)

(58) Field of Classification Search
CPC ....... G09G 2310/08; G09G 2320/0223; G09G 2320/0233
See application file for complete search history.

(56) References Cited

U.S. PATENT DOCUMENTS

| | | | | |
|---|---|---|---|---|
| 2018/0211601 | A1 | 7/2018 | Chen et al. | |
| 2019/0096327 | A1 | 3/2019 | Peng et al. | |
| 2019/0333446 | A1 | 10/2019 | Yin | |
| 2019/0355300 | A1* | 11/2019 | Wu | G09G 3/3225 |
| 2020/0380920 | A1* | 12/2020 | Lee | G09G 3/3291 |
| 2021/0233969 | A1* | 7/2021 | Sun | H10K 59/353 |
| 2021/0256910 | A1 | 8/2021 | Chen et al. | |
| 2021/0343241 | A1* | 11/2021 | Seo | G09G 3/3291 |
| 2021/0350744 | A1 | 11/2021 | Cai | |
| 2021/0358405 | A1* | 11/2021 | Yang | G09G 3/3233 |
| 2022/0148511 | A1* | 5/2022 | Kim | G09G 3/3266 |

FOREIGN PATENT DOCUMENTS

| | | | |
|---|---|---|---|
| CN | 104821150 | A | 8/2015 |
| CN | 106504703 | A | 3/2017 |
| CN | 107610652 | A | 1/2018 |
| CN | 108597453 | A | 9/2018 |
| CN | 110010076 | A | 7/2019 |
| CN | 110428774 | A | 11/2019 |

* cited by examiner

PIXEL CIRCUIT, DRIVING METHOD, DISPLAY SUBSTRATE AND DISPLAY DEVICE

CROSS-REFERENCE TO RELATED APPLICATION

The present application is a U.S. National Phase of International Application No. PCT/CN2021/115319, entitled "PIXEL CIRCUIT, DRIVING METHOD, DISPLAY SUBSTRATE AND DISPLAY DEVICE", and filed on Aug. 30, 2021. The entire contents of the above-listed application are hereby incorporated by reference for all purposes.

TECHNICAL FIELD

The present disclosure relates to the field of display technology, in particular to a pixel circuit, a driving method, a display substrate and a display device.

BACKGROUND

During the operation of the existing pixel circuit, the current flowing through the light-emitting element in the light-emitting phase cannot be independent of the voltage value of the first voltage signal connected to the first end of the driving circuit in the pixel circuit, thereby affecting the display uniformity.

SUMMARY

In one aspect, the present disclosure provides in some embodiments a pixel circuit, including a light-emitting element, a driving circuit, a compensation control circuit, a data writing-in circuit, a first reset circuit, a light-emitting control circuit and an energy storage circuit; the compensation control circuit is electrically connected to a scan line, a control end of the driving circuit and a first end of the driving circuit respectively, and is configured to control to connect the control end of the driving circuit and a first end of the driving circuit under the control of a scan signal provided by the scan line; the data writing-in circuit is electrically connected to the scan line, a data line and a second end of the driving circuit respectively, and is configured to write a data voltage on the data line into the second end of the driving circuit under the control of the scan signal; the first reset circuit is electrically connected to a reset control line, a reference voltage line and the control end of the driving circuit, respectively, is configured to write a reference voltage provided by the reference voltage line into the control end of the driving circuit under the control of a reset control signal provided by the reset control line; the light-emitting control circuit is respectively electrically connected to a light-emitting control line, the second end of the driving circuit and a first electrode of the light-emitting element, and is configured to control to connect the second end of the driving circuit and the first electrode of the light-emitting element under the control of a light-emitting control signal provided by the light-emitting control line; the energy storage circuit is respectively electrically connected to the control end of the driving circuit and the first electrode of the light-emitting element, and is configured to store electrical energy; the driving circuit is configured to control to connect the first end of the driving circuit and the second end of the driving circuit under the control of the control end of the driving circuit.

Optionally, the compensation control circuit includes a first transistor; a gate electrode of the first transistor is electrically connected to the scan line, a first electrode of the first transistor is electrically connected to the control end of the driving circuit, and a second electrode of the first transistor is electrically connected to the first end of the driving circuit; the first reset circuit includes a second transistor; a gate electrode of the second transistor is electrically connected to the reset control line, a first electrode of the second transistor is electrically connected to the reference voltage line, and a second electrode of the second transistor is electrically connected to the control end of the driving circuit; the data writing-in circuit includes a third transistor; a gate electrode of the third transistor is electrically connected to the scan line, a first electrode of the third transistor is electrically connected to the data line, and a second electrode of the third transistor is electrically connected to the second end of the driving circuit.

Optionally, the first transistor and/or the second transistor is a metal oxide thin film transistor; and/or the third transistor is a metal oxide thin film transistor.

Optionally, the energy storage circuit comprises a storage capacitor; a first electrode plate of the storage capacitor is electrically connected to the control end of the driving circuit, and a second electrode plate of the storage capacitor is electrically connected to the first electrode of the light-emitting element.

Optionally, the pixel circuit further includes a second reset circuit; the second reset circuit is respectively electrically connected to the reset control line, the initial voltage line and the first electrode of the light-emitting element, and is configured to write the initial voltage provided by the initial voltage line into the first electrode of the light-emitting element under the control of the reset control signal.

Optionally, the second reset circuit comprises a fourth transistor; a gate electrode of the fourth transistor is electrically connected to the reset control line, a first electrode of the fourth transistor is electrically connected to the initial voltage line, and a second electrode of the fourth transistor is electrically connected to the first electrode of the light-emitting element.

Optionally, the light-emitting control circuit is also electrically connected to the first voltage line and the first end of the driving circuit, is configured to control to connect the first voltage line and the first end of the driving circuit under the control of the light-emitting control signal.

Optionally, the light-emitting control circuit comprises a fifth transistor and a sixth transistor; a gate electrode of the fifth transistor is electrically connected to the light-emitting control line, a first electrode of the fifth transistor is electrically connected to the first voltage line, and a second electrode of the fifth transistor is electrically connected to the first end of the driving circuit; a gate electrode of the sixth transistor is electrically connected to the light-emitting control line, a first electrode of the sixth transistor is electrically connected to the second end of the driving circuit, and a second electrode of the sixth transistor is electrically connected to the first electrode of the light-emitting element; a second electrode of the light-emitting element is electrically connected to the second voltage line.

Optionally, the driving circuit comprises a driving transistor; a gate electrode of the driving transistor is electrically connected to the control end of the driving circuit, a first electrode of the driving transistor is electrically connected to the first end of the driving circuit, and a second electrode of the driving transistor is electrically connected to the second end of the driving circuit.

In a second aspect, a driving method is applied to the pixel circuit, wherein a display period includes a reset phase, a compensation phase and a light-emitting phase; the driving method includes: in the reset phase, writing, by the first reset circuit, a reference voltage into the control end of the driving circuit under the control of the reset control signal, so that at the beginning of the compensation phase, controlling, by the driving circuit, to connect the first end of the driving circuit and the second end of the driving circuit under the control of the potential of the control end of the driving circuit; in the compensation phase, controlling, by the compensation control circuit, to connect the control end of the driving circuit and the first end of the driving circuit under the control of the scan signal, and writing, by the data writing-in circuit, the data voltage on the data line into the second end of the driving circuit under the control of the scan signal; at the beginning of the compensation phase, controlling, by the driving circuit, to connect the first end of the driving circuit and the second end of the driving circuit under the control of the potential of the control end of the driving circuit, to charge the energy storage circuit through the data voltage on the data line until the driving circuit disconnects the first end of the driving circuit from the second end of the driving circuit; in the light-emitting phase, controlling, by the light-emitting control circuit, to connect the second end of the driving circuit and the first electrode of the light-emitting element under the control of the light-emitting control signal.

Optionally, the light-emitting control circuit is further electrically connected to the first voltage line and the first end of the driving circuit, the driving method further includes: In the light-emitting phase, controlling, by the light-emitting control circuit, to connect the first voltage line and the first end of the driving circuit under the control of the light-emitting control signal.

Optionally, the pixel circuit further comprises a second reset circuit, the driving method further includes: in the reset phase, writing, by the second reset circuit, an initial voltage into the first electrode of the light-emitting element under the control of a reset control signal to control the light-emitting element not to emit light.

In a third aspect, a display substrate includes a base substrate and a plurality of sub-pixels arranged on the base substrate, the sub-pixels includes the pixel circuit.

Optionally, the compensation control circuit includes a first transistor, the first reset circuit includes a second transistor, and the data writing-in circuit includes a third transistor; the first transistor includes a first active pattern, and the second transistor includes a second active pattern, the third transistor includes a third active pattern; the first active pattern, the second active pattern and the third active pattern are formed by the same semiconductor layer; the semiconductor layer is made of a metal oxide material.

Optionally, the semiconductor layer is a first semiconductor layer; the pixel circuit further includes a second reset circuit; the second reset circuit includes a fourth transistor; the light-emitting control circuit includes a fifth transistor and a sixth transistor; the driving circuit includes a driving transistor; the fourth transistor includes a fourth active pattern, and the fifth transistor includes a fifth active pattern, the sixth transistor includes a sixth active pattern, and the driving transistor includes a driving active pattern; the fourth active pattern, the fifth active pattern, the sixth active pattern and the driving active pattern are formed of a second semiconductor layer; the first semiconductor layer and the second semiconductor layer are different layers.

Optionally, the driving circuit includes a driving transistor, the energy storage circuit includes a storage capacitor; the compensation control circuit includes a first transistor; the data writing-in circuit includes a third transistor; the sub-pixel includes a first scan line and a first reset control line; the first gate electrode of the first transistor, the first gate electrode of the third transistor and the first scan line form an integrated structure; the first transistor includes a first active pattern, the third transistor includes a third active pattern, at least part of the first active pattern extends along the first direction, at least part of the third active pattern extends along a first direction; the first active pattern and the third active pattern are arranged along a second direction, and the second direction intersects the first direction; the orthographic projection of at least part of the first active pattern on the based substrate is located between the orthographic projection of the first reset control line on the base substrate and the orthographic projection of the gate electrode of the driving transistor on the base substrate; the orthographic projection of at least part of the third active pattern on the base substrate is located between the orthographic projection of the first reset control line on the base substrate and the orthographic projection of the gate electrode of the driving transistor on the base substrate.

Optionally, the first reset control line, the first scan line and the second electrode plate of the storage capacitor are located in the same layer; the sub-pixel further includes a second reset control line and a second scan line arranged in the same layer; the first reset control line and the second reset control line are located at different layers; the second gate electrode of the first transistor, the second gate electrode of the third transistor and the second scan line form an integral structure.

Optionally, the first reset control line is located between the second semiconductor layer and the base substrate, and the second reset control line is located on a side of the second semiconductor layer away from the base substrate.

Optionally, the orthographic projection of the first gate electrode of the first transistor on the base substrate at least partially overlaps the orthographic projection of the second gate electrode of the first transistor on the base substrate, the orthographic projection of the first gate electrode of the third transistor on the base substrate at least partially overlaps the orthographic projection of the second gate electrode of the third transistor on the base substrate.

Optionally, the sub-pixel further comprises a reference voltage line; the first reset circuit comprises a second transistor; the second transistor includes a second active pattern; at least part of the second active pattern extends in a first direction, and an orthographic projection of at least part of the second active pattern on the base substrate is located between the orthographic projection of the reference voltage line on the base substrate and the orthographic projection of the first scan line on the base substrate; the first gate electrode of the second transistor and the first reset control line form an integrated structure; the first electrode of the second transistor is electrically connected to the reference voltage line, and the second electrode of the second transistor is electrically connected to the gate electrode of the driving transistor.

Optionally, the first reset control line, the first scan line and the second electrode plate of the storage capacitor are located on the same layer; the sub-pixel further includes a second reset control line and a second scan line located at the same layer; the first reset control line and the second reset control line are located at different layers; the second gate electrode of the second transistor and the second reset control line form an integral structure.

Optionally, an orthographic projection of the first gate electrode of the second transistor on the base substrate at least partially overlaps an orthographic projection of the second gate electrode of the second transistor on the base substrate.

Optionally, the compensation control circuit includes a first transistor; the pixel circuit further includes a second transistor; the sub-pixel further includes a first voltage line; the first transistor includes a first active pattern; the second transistor including a second active pattern; the orthographic projection of the first voltage line on the base substrate covers the orthographic projection of the first active pattern on the base substrate and the orthographic projection of the second active pattern on the base substrate; the first electrode of the first transistor and the second electrode of the second transistor are electrically connected through a first conductive connection portion, and the orthographic projection of the first voltage line on the base substrate covers the orthographic projection of the first conductive connection portion on the base substrate; the first voltage line is arranged on a side of the first electrode of the first transistor away from the base substrate.

In a fourth aspect, a display device includes the display substrate.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative work shall fall within the protection scope of the present disclosure.

The transistors used in all the embodiments of the present disclosure may be triodes, thin film transistors, field effect transistors, or other devices with the same characteristics. In the embodiments of the present disclosure, in order to distinguish the two electrodes of the transistor except the control electrode, one electrode is called the first electrode, and the other electrode is called the second electrode.

In actual operation, when the transistor is a triode, the control electrode may be the base, the first electrode may be the collector, and the second electrode may be the emitter; or the control electrode may be the base, the first electrode can be the emitter, and the second electrode can be the collector.

In actual operation, when the transistor is a thin film transistor or a field effect transistor, the control electrode may be a gate electrode, the first electrode may be a drain electrode, and the second electrode may be a source electrode; or the control electrode may be a gate electrode, the first electrode may be a source electrode, and the second electrode may be a drain electrode.

Figure 1:
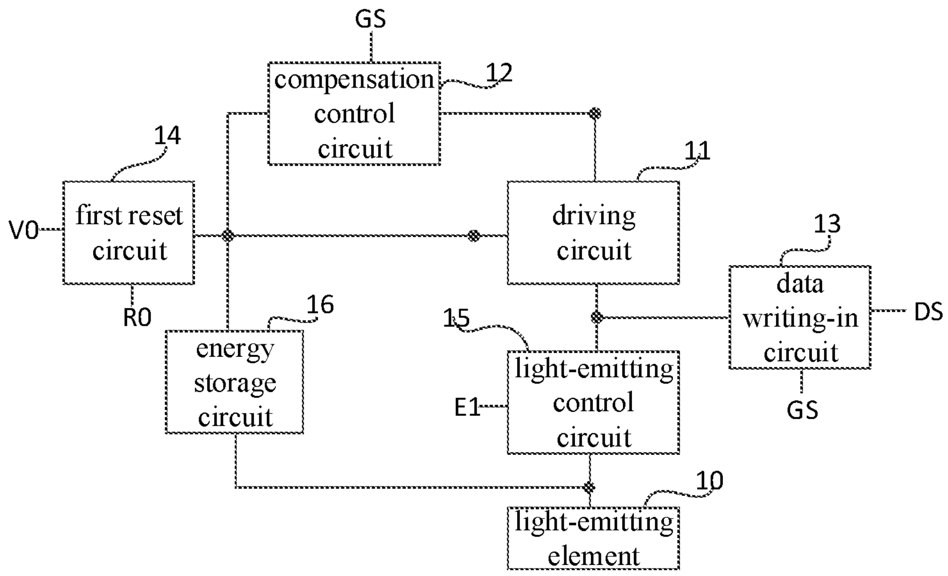
FIG. 1 is a structural diagram of a pixel circuit according to at least one embodiment of the present disclosure.

As shown in FIG. 1, the pixel circuit according to the embodiment of the present disclosure includes a light-emitting element 10, a driving circuit 11, a compensation control circuit 12, a data writing-in circuit 13, a first reset circuit 14, a light-emitting control circuit 15 and an energy storage circuit 16;

The compensation control circuit 12 is electrically connected to a scan line GS, a control end of the driving circuit 11 and a first end of the driving circuit 11 respectively, and is configured to control to connect the control end of the driving circuit 11 and a first end of the driving circuit 11 under the control of a scan signal provided by the scan line GS;

The data writing-in circuit 13 is electrically connected to the scan line GS, a data line DS and a second end of the driving circuit 11 respectively, and is configured to write a data voltage on the data line DS into the second end of the driving circuit 11 under the control of the scan signal;

The first reset circuit 14 is electrically connected to a reset control line R0, a reference voltage line V0 and the control end of the driving circuit 11, respectively, is configured to write a reference voltage provided by the reference voltage line V0 into the control end of the driving circuit 11 under the control of a reset control signal provided by the reset control line R0;

The light-emitting control circuit 15 is respectively electrically connected to a light-emitting control line E1, and the second end of the driving circuit 11 is electrically connected to a first electrode of the light-emitting element 10, and is configured to control to connect the second end of the driving circuit 11 and the first electrode of the light-emitting element 10 under the control of a light-emitting control signal provided by the light-emitting control line E1;

The energy storage circuit 16 is respectively electrically connected to the control end of the driving circuit 11 and the first electrode of the light-emitting element 10, and is configured to store electrical energy;

The driving circuit 11 is configured to control to connect the first end of the driving circuit 11 and the second end of the driving circuit 11 under the control of the control end of the driving circuit.

In the pixel circuit described in the embodiment of the present disclosure, under the control of the scan signal, the compensation control circuit controls to connect the control end of the driving circuit and the first end of the driving circuit, and the data writing-in circuit writes the data voltage into the second end of the driving circuit under the control of the scan signal, the energy storage circuit is electrically connected between the control end of the driving circuit and the first electrode of the light-emitting element, and the current flowing through the light-emitting element in the light-emitting stage is independent of the first voltage signal provided by the first voltage line under corresponding timing, so as to avoid the phenomenon of uneven display brightness caused by IR drop on the first voltage line (IR drop is a phenomenon that occurs in integrated circuit that voltage on the power supply and ground network increases or decreases).

In addition, when the pixel circuit described in the embodiments of the present disclosure is in operation, by setting the voltage value of the reference voltage, the charging capability of the pixel circuit during high-frequency driving can be effectively improved.

Optionally, the compensation control circuit includes a first transistor;

A gate electrode of the first transistor is electrically connected to the scan line, a first electrode of the first transistor is electrically connected to the control end of the driving circuit, and a second electrode of the first transistor is electrically connected to the first end of the driving circuit;

the first reset circuit includes a second transistor;

A gate electrode of the second transistor is electrically connected to the reset control line, a first electrode of the second transistor is electrically connected to the reference voltage line, and a second electrode of the second transistor is electrically connected to the control end of the driving circuit;

the data writing-in circuit includes a third transistor;

A gate electrode of the third transistor is electrically connected to the scan line, a first electrode of the third transistor is electrically connected to the data line, and a second electrode of the third transistor is electrically connected to the second end of the driving circuit.

In at least one embodiment of the present disclosure, the first transistor and/or the second transistor is a metal oxide thin film transistor; and/or the third transistor is a metal oxide thin film transistor.

In specific implementation, the first transistor and/or the second transistor are set as metal oxide thin film transistors, so as to reduce the leakage current of the leakage path of the first node (the first node is the node electrically connected to the control end of the driving circuit), which is beneficial for realizing the demand of low frequency display driving;

The third transistor can also be set as a metal oxide thin film transistor, so as to reduce the leakage current on the leakage path of the third node (the third node is the node connected to the second end of the driving circuit).

Optionally, the metal oxide thin film transistor may be an indium gallium zinc oxide (IGZO) thin film transistor, but not limited thereto.

Optionally, the energy storage circuit includes a storage capacitor;

A first electrode plate of the storage capacitor is electrically connected to the control end of the driving circuit, and a second electrode plate of the storage capacitor is electrically connected to the first electrode of the light-emitting element.

Figure 2:
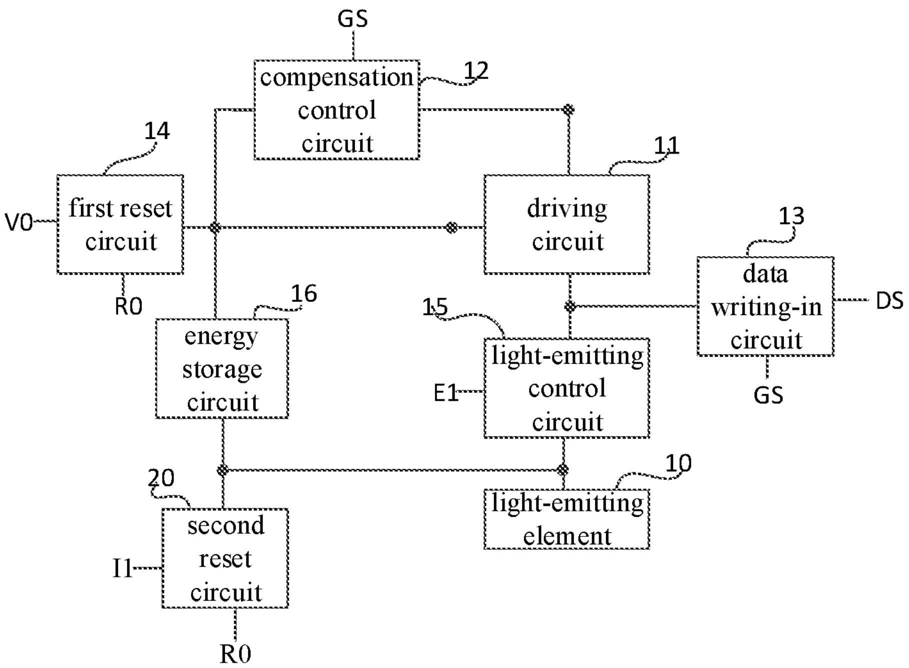
FIG. 2 is a structural diagram of a pixel circuit according to at least one embodiment of the present disclosure.

As shown in FIG. 2, on the basis of at least one embodiment of the pixel circuit shown in FIG. 1, the pixel circuit according to at least one embodiment of the present disclosure may further include a second reset circuit 20;

The second reset circuit 20 is respectively electrically connected to the reset control line R0, the initial voltage line I1 and the first electrode of the light-emitting element 10, and is configured to write the initial voltage provided by the initial voltage line I1 into the first electrode of the light-emitting element 10 under the control of the reset control signal, to control the light-emitting element 10 not to emit light, and to clear the residual charge of the first electrode of the light-emitting element 10.

In at least one embodiment of the present disclosure, the light-emitting element 10 may be an Organic Light Emitting Diode (OLED), the first electrode of the light-emitting element 10 may be an anode of the OLED, and the second electrode of the light-emitting element 10 may be a cathode of the OLED; the second electrode of the light-emitting element 10 can be electrically connected to the second voltage line.

Optionally, the second reset circuit includes a fourth transistor;

A gate electrode of the fourth transistor is electrically connected to the reset control line, a first electrode of the fourth transistor is electrically connected to the initial voltage line, and a second electrode of the fourth transistor is electrically connected to the first electrode of the light-emitting element.

Figure 3:
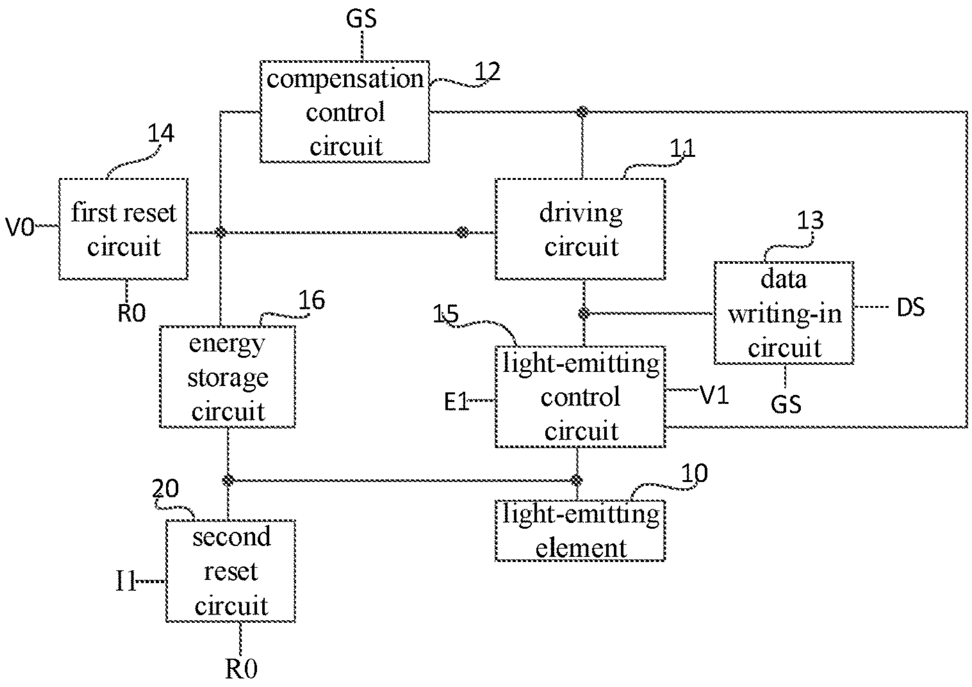
FIG. 3 is a structural diagram of a pixel circuit according to at least one embodiment of the present disclosure.

As shown in FIG. 3, on the basis of at least one embodiment of the pixel circuit shown in FIG. 2, the light-emitting control circuit 15 is also electrically connected to the first voltage line V1 and the first end of the driving circuit 11, is configured to control to connect the first voltage line V1 and the first end of the driving circuit 11 under the control of the light-emitting control signal.

During operation of at least one embodiment of the pixel circuit shown in FIG. 3 of the present disclosure, the display period may include a reset phase, a compensation phase, and a light-emitting phase that are arranged in sequence;

In the reset phase, the first reset circuit writes a reference voltage into the control end of the driving circuit under the control of the reset control signal, so that at the beginning of the compensation phase, the driving circuit can connect the first end of the driving circuit and the second end of the driving circuit under the control of the potential of the control end of the driving circuit;

In the compensation phase, the compensation control circuit controls to connect the control end of the driving circuit and the first end of the driving circuit under the control of the scan signal, and the data writing-in circuit controls to write the data voltage on the data line into the second end of the driving circuit under the control of the scan signal;

At the beginning of the compensation phase, the driving circuit controls to connect the first end of the driving circuit and the second end of the driving circuit, under the control of the potential of the control end thereof, to charge the energy storage circuit through the data voltage of the data line until the driving circuit disconnects the first end of the driving circuit from the second end of the driving circuit;

In the light-emitting phase, the light-emitting control circuit controls to connect the first voltage line and the first end of the driving circuit under the control of the light-emitting control signal, and the light-emitting control circuit controls to connect the second end of the driving circuit and the first electrode of the light-emitting element under the control of the light-emitting control signal.

Optionally, the light-emitting control circuit includes a fifth transistor and a sixth transistor;

A gate electrode of the fifth transistor is electrically connected to the light-emitting control line, a first electrode of the fifth transistor is electrically connected to the first voltage line, and a second electrode of the fifth transistor is electrically connected to the first end of the driving circuit;

A gate electrode of the sixth transistor is electrically connected to the light-emitting control line, a first electrode of the sixth transistor is electrically connected to the second end of the driving circuit, and a second electrode of the sixth transistor is electrically connected to the first electrode of the light-emitting element;

A second electrode of the light-emitting element is electrically connected to the second voltage line.

Optionally, the driving circuit includes a driving transistor;

A gate electrode of the driving transistor is electrically connected to the control end of the driving circuit, a first electrode of the driving transistor is electrically connected to the first end of the driving circuit, and a second electrode of the driving transistor is electrically connected to the second end of the driving circuit.

Figure 4A:
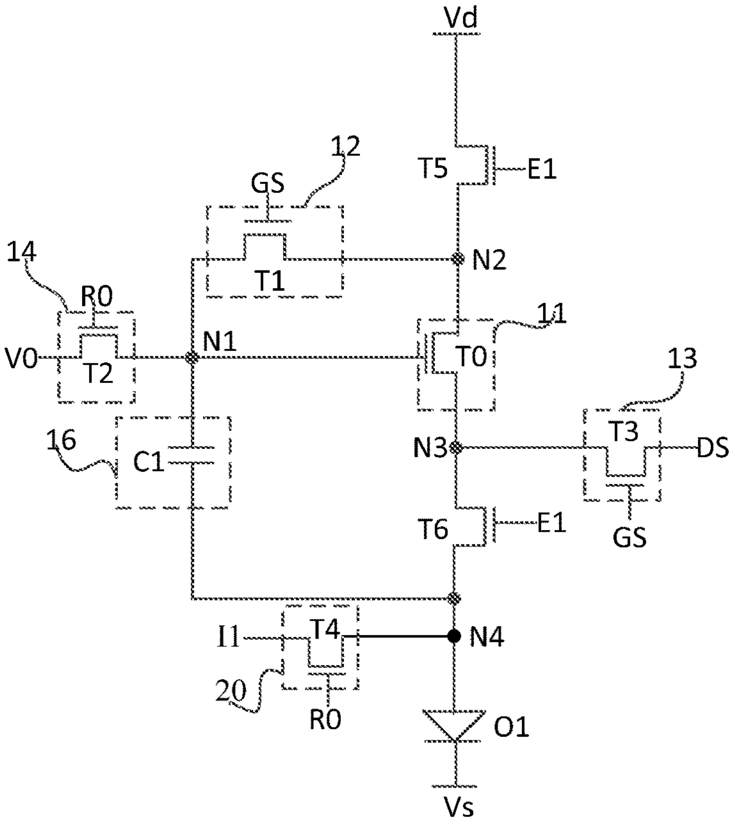
FIG. 4A is a circuit diagram of a pixel circuit according to at least one embodiment of the present disclosure.

As shown in FIG. 4A, in at least one embodiment of the present disclosure, based on at least one embodiment of the pixel circuit shown in FIG. 3, the light-emitting element is an organic light-emitting diode O1; the driving circuit 11 includes a driving transistor T0;

The compensation control circuit 12 includes a first transistor T1;

The gate electrode of the first transistor T1 is electrically connected to the scan line G1, the first electrode of the first transistor T1 is electrically connected to the gate electrode of the driving transistor T0, and the second electrode of the first transistor T1 is electrically connected to the first electrode of the driving transistor T0;

The first reset circuit 14 includes a second transistor T2;

The gate electrode of the second transistor T2 is electrically connected to the reset control line R0, the first electrode of the second transistor T2 is electrically connected to the reference voltage line V0, and the second electrode of the second transistor T2 is electrically connected to the gate electrode of the driving transistor T0;

The data writing-in circuit 13 includes a third transistor T3;

The gate electrode of the third transistor T3 is electrically connected to the scan line G1, the first electrode of the third transistor T3 is electrically connected to the data line D1, and the second electrode of the third transistor T3 is electrically connected to the second electrode of the driving transistor T0.

The second reset circuit 20 includes a fourth transistor T4;

The gate electrode of the fourth transistor T4 is electrically connected to the reset control line R0, the first electrode of the fourth transistor T4 is electrically connected to the initial voltage line I1, and the second electrode of the fourth transistor T4 is electrically connected to the anode of the organic light-emitting diode O1;

The light-emitting control circuit includes a fifth transistor T5 and a sixth transistor T6;

The gate electrode of the fifth transistor T5 is electrically connected to the light-emitting control line E1, the first electrode of the fifth transistor T5 is electrically connected to the high voltage line Vd, and the second electrode of the fifth transistor T5 is electrically connected to the first electrode of the driving transistor T0; the high voltage line Vd is used to provide a high voltage signal;

The gate electrode of the sixth transistor T6 is electrically connected to the light-emitting control line E1, the first electrode of the sixth transistor T6 is electrically connected to the second electrode of the driving transistor T0, and the second electrode of the sixth transistor T6 is electrically connected to the anode of the organic light-emitting diode O1;

The cathode of the organic light emitting diode O1 is electrically connected to the low voltage line Vs;

The energy storage circuit 16 includes a storage capacitor C1;

A first electrode plate of the storage capacitor C1 is electrically connected to the gate electrode of the driving transistor T0, and a second electrode plate of the storage capacitor C1 is electrically connected to the anode of the organic light emitting diode O1.

In at least one embodiment of the pixel circuit shown in FIG. 4A, the first voltage line is a high voltage line Vd, and the second voltage line is a low voltage line Vs.

In at least one embodiment of the pixel circuit shown in FIG. 4A, T1, T2 and T3 are all IGZO thin film transistors, and T0, T4, T5 and T6 are all N-type metal-oxide-semiconductor (NMOS) transistors.

In at least one embodiment of the pixel circuit shown in FIG. 4A, all the transistors are n-type transistors, so only one GOA (a gate on array provided on the array substrate) providing a scan signal that is valid in a high voltage needs to be used, which can effectively reduce the width of the driving circuit provided in the peripheral area.

In FIG. 4A, the first node is labeled N1, the second node is labeled N2, the third node is labeled N3, and the fourth node is labeled N4; the gate electrode of TO is electrically connected to the first node N1, the second node N2 is electrically connected to the first electrode of T0, the third node N3 is electrically connected to the second electrode of T0, and N4 is electrically connected to the anode of O1.

Figure 5A:
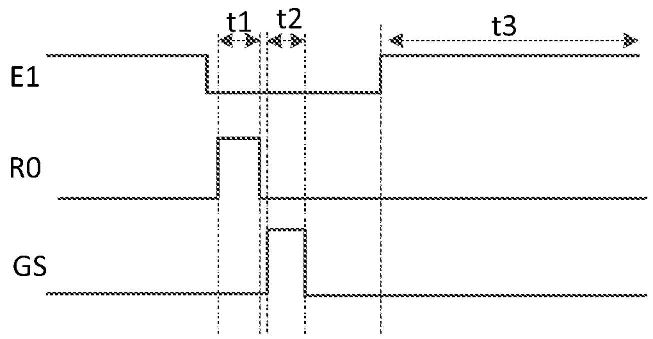
FIG. 5A is a timing diagram of the pixel circuit shown in FIG. 4A according to at least one embodiment of the present disclosure.

As shown in FIG. 5A, during operation of at least one embodiment of the pixel circuit shown in FIG. 4A of the present disclosure, the display period includes a reset phase t1, a compensation phase t2 and a light-emitting phase t3;

In the reset phase t1, E1 provides a low voltage signal, R0 provides a high voltage signal, GS provides a low voltage signal, both T2 and T4 are turned on, and TO, T1, T3, T5 and T6 are all turned off, and the reference voltage Vref is written into N1, so that when the compensation phase t2 starts, T0 can be turned on; the initial voltage Vi is written into N4, so that O1 does not emit light, and removes the residual charge of the anode of O1;

In the compensation stage t2, E1 provides a low voltage signal, R0 provides a low voltage signal, GS provides a high voltage signal, T1 is turned on, T3 is turned on, N1 and N2 are connected, and the data voltage Vdata on the data line DS is written into N3;

At the beginning of the compensation phase t2, TO is turned on to charge C1 through Vdata, the potential of N1 is increased until the potential of N1 becomes Vdata+Vth (Vth is the threshold voltage of T0), T0 is turned off, and Vth is written to T0, the threshold voltage compensation is completed;

In the light-emitting stage t3, T5 and T6 are all turned on, and T1, T2, T3 and T4 are all turned off, and T1 is an IGZO thin film transistor to prevent leakage current between N1 and N2 in the light-emitting phase t3. At this time, the potential of N2 is VDD (VDD is the voltage value of the high-voltage signal provided by the high-voltage line Vd), the voltage of N4 is changed to Voled−Vi, at this time both ends of C1 are on float, the voltage of N1 becomes Vdata+Vth+Voled−Vi, at this time the gate-source voltage of T0 is Vdata+Vth+Voled−Vi−Voled, the current value of the driving current that TO drives O1 to emit light is equal to K $(Vdata-Vi)^2$, the current value of the driving current is not related to the voltage value VDD of the high voltage signal provided by the high voltage line Vd.

In at least one embodiment of the pixel circuit shown in FIG. 4A of the present disclosure, the voltage value of the reference voltage Vref is greater than the threshold voltage Vth of T0. According to the requirement of high-frequency driving, the charging capability of the pixel can be improved by adjusting the voltage value of the reference voltage Vref. During high-frequency driving, the compensation phase t2 lasts for a short time. At this time, the charging speed can be accelerated by increasing the voltage value of Vref, and the charging capability of the pixel can be improved.

Figure 5B:
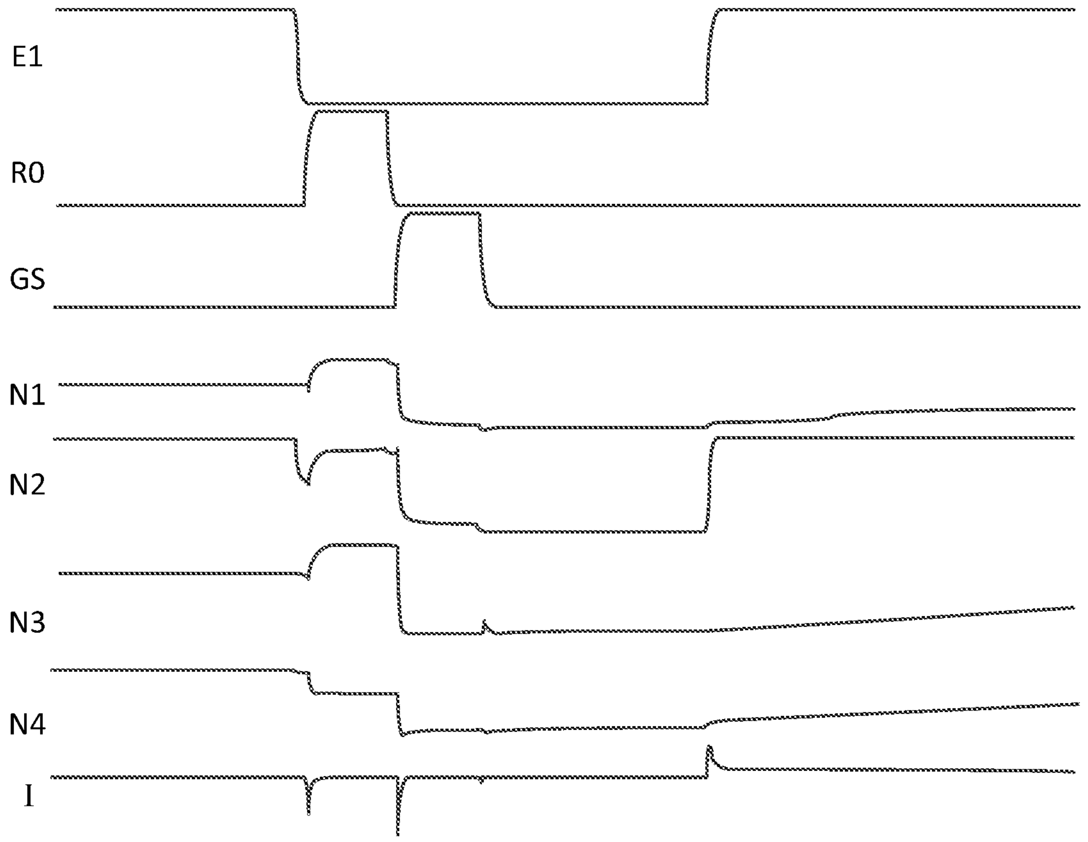
FIG. 5B is a simulation timing diagram of the pixel circuit shown in FIG. 4A according to at least one embodiment of the present disclosure.

FIG. 5B is a simulation timing diagram of the pixel circuit shown in FIG. 4A of at least one embodiment of the present disclosure, wherein I is the driving current flowing through the driving transistor. FIG. 5B shows the potential of N1, the potential of N2, the potential of N3, and the potential of N4.

Figure 4B:
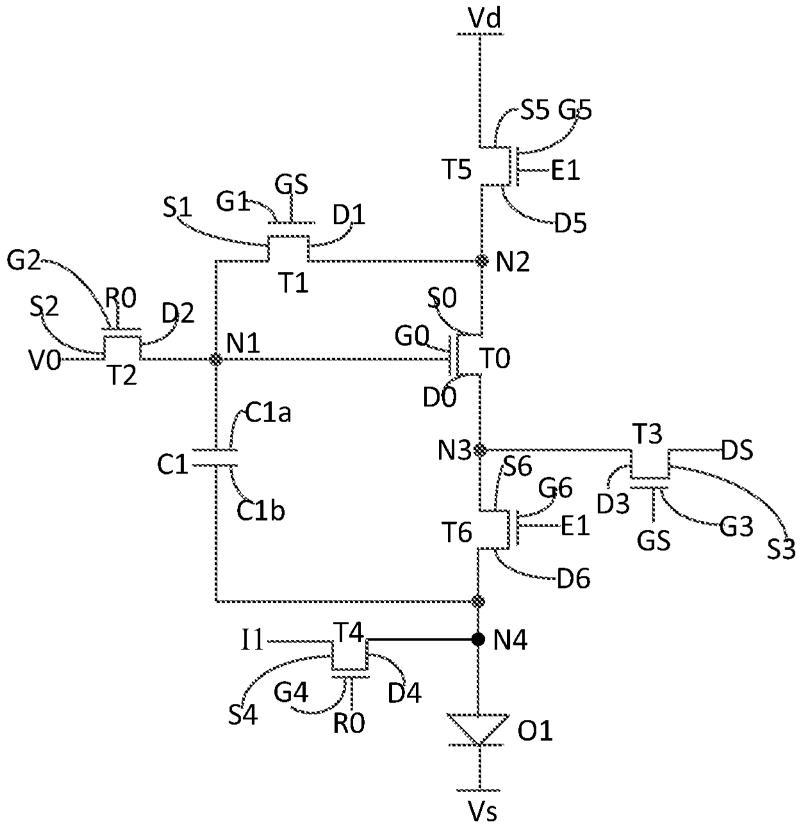
FIG. 4B is a schematic diagram of the electrodes of each transistor and the electrode plates of the storage capacitor marked on the basis of FIG. 4A.

As shown in FIG. 4B, on the basis of at least one embodiment of the pixel circuit shown in FIG. 4A, labels are added to the electrodes of the transistors and the electrode plates of the storage capacitor.

As shown in FIG. 4B, the gate electrode G1 of the first transistor T1 is electrically connected to the scan line GS, and the first electrode S1 of the first transistor T1 is electrically connected to the gate electrode G0 of the driving transistor T0, so the second electrode D1 of the first transistor T1 is electrically connected to the first electrode S0 of the driving transistor T0;

The gate electrode G2 of the second transistor T2 is electrically connected to the reset control line R0, the first electrode S2 of the second transistor T2 is electrically connected to the reference voltage line V0, and the second electrode S2 of the second transistor T2 is electrically connected to the gate electrode G0 of the driving transistor T0;

The gate electrode G3 of the third transistor T3 is electrically connected to the scan line GS, the first electrode S3 of the third transistor T3 is electrically connected to the data line DS, and the second electrode D3 of the third transistor T3 is electrically connected to the second electrode D0 of the driving transistor T0.

The gate electrode G4 of the fourth transistor T4 is electrically connected to the reset control line R0, the first electrode S4 of the fourth transistor T4 is electrically connected to the initial voltage line 11, and the second electrode D4 of the fourth transistor T4 is electrically connected to the anode of the organic light emitting diode O1;

The gate electrode G5 of the fifth transistor T5 is electrically connected to the light-emitting control line E1, the first electrode S5 of the fifth transistor T5 is electrically connected to the high voltage line Vd, and the second electrode D5 of the fifth transistor T5 is electrically connected to the first electrode S0 of the driving transistor T0; the high-voltage line Vd is used to provide a high voltage signal;

The gate electrode G6 of the sixth transistor T6 is electrically connected to the light-emitting control line E1, the first electrode S6 of the sixth transistor T6 is electrically connected to the second electrode DO of the driving transistor T0, and the second electrode D6 of the sixth transistor T6 is electrically connected to the anode of the organic light emitting diode O1;

The cathode of the organic light emitting diode O1 is electrically connected to the low voltage line Vs;

The energy storage circuit 16 includes a storage capacitor C1;

The first electrode plate C1*a* of the storage capacitor C1 is electrically connected to the gate electrode G1 of the driving transistor T0, and the second electrode plate C1*b* of the storage capacitor C1 is electrically connected to the anode of the organic light emitting diode O1.

The driving method described in the embodiment of the present disclosure is applied to the above-mentioned pixel circuit, and the display period includes a reset phase, a compensation phase, and a light-emitting phase; the driving method includes:

In the reset phase, writing, by the first reset circuit, a reference voltage into the control end of the driving circuit under the control of the reset control signal, so that at the beginning of the compensation phase, controlling, by the driving circuit, to connect the first end of the driving circuit and the second end of the driving circuit under the control of the potential of the control end of the driving circuit; writing, by the second reset circuit, the initial voltage into the first electrode of the light-emitting element under the control of the reset control signal, to control the light-emitting element not to emit light In the compensation stage, controlling, by the compensation control circuit, to connect the control end of the driving circuit and the first end of the driving circuit under the control of the scan signal, and writing, by the data writing-in circuit, the data voltage on the data line into the second end of the driving circuit under the control of the scan signal;

At the beginning of the compensation phase, controlling, by the driving circuit, to connect the first end of the driving circuit and the second end of the driving circuit under the control of the potential of the control end of the driving circuit, to charge the energy storage circuit through the data voltage on the data line until the driving circuit disconnects the first end of the driving circuit from the second end of the driving circuit;

In the light-emitting phase, controlling, by the light-emitting control circuit, to connect the second end of the driving circuit and the first electrode of the light-emitting element under the control of the light-emitting control signal, and controlling, by the light-emitting control circuit, to connect the first voltage line and the first end of the driving circuit under the control of the light-emitting control signal.

In the driving method described in the embodiment of the present disclosure, the compensation control circuit controls to connect the control end of the driving circuit and the first end of the driving circuit under the control of the scan signal, and the data writing-in circuit writes the data voltage into the second end of the driving circuit under the control of the scan signal, the energy storage circuit is electrically connected between the control end of the driving circuit and the first electrode of the light-emitting element, and the current flowing through the light-emitting element in the light-emitting stage is independent of the first voltage signal provided by the first voltage line with corresponding timing, so as to avoid uneven display brightness caused by IR drop on the first voltage line (IR drop is a phenomenon that occurs in integrated circuits that the voltage of the power supply and ground network increases and decreases).

Optionally, the light-emitting control circuit is further electrically connected to the first voltage line and the first end of the driving circuit, and the driving method further includes:

In the light-emitting phase, controlling, by the light-emitting control circuit, to connect the first voltage line and the first end of the driving circuit under the control of the light-emitting control signal.

In at least one embodiment of the present disclosure, the pixel circuit further includes a second reset circuit, and the driving method further includes:

In the reset phase, writing, by the second reset circuit, an initial voltage into the first electrode of the light-emitting element under the control of a reset control signal to control the light-emitting element not to emit light.

The display substrate according to at least one embodiment of the present disclosure includes a base substrate and a plurality of sub-pixels arranged on the base substrate, and the sub-pixel includes the above-mentioned pixel circuit.

Optionally, the compensation control circuit includes a first transistor, the first reset circuit includes a second transistor, and the data writing-in circuit includes a third transistor; the first transistor includes a first active pattern, and the second transistor includes a second active pattern, the third transistor includes a third active pattern; the first active pattern, the second active pattern and the third active pattern are formed by the same semiconductor layer; the semiconductor layer is made of a metal oxide material.

In at least one embodiment of the present disclosure, the compensation control circuit includes a first active pattern of a first transistor, a second active pattern of a second transistor included in the first reset circuit, and the active pattern of the third transistor included in the data writing-in circuit may be formed of the same semiconductor layer, and the semiconductor layer may be made of a metal oxide material, so that the first transistor, the second transistor and the third transistor are all metal oxide thin film transistors.

Figure 9:
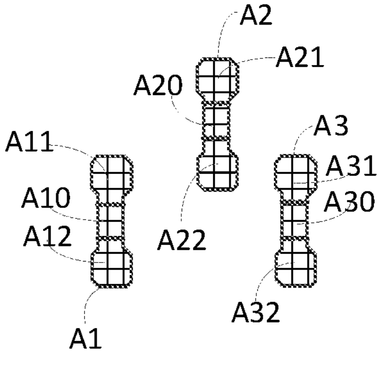
FIG. 9 is a schematic diagram of the first semiconductor layer in FIG. 18.

As shown in FIG. 9, the first active pattern included in T1 is labeled A1, the second active pattern included in T2 is labeled A2, the third active pattern of T3 is labeled A3, A1, A2 and A3 are formed by the first semiconductor layer.

In at least one embodiment of the present disclosure, the semiconductor layer is a first semiconductor layer (the first semiconductor layer may be made of a metal oxide material); the pixel circuit further includes a second reset circuit; the second reset circuit includes a fourth transistor; the light-emitting control circuit includes a fifth transistor and a sixth transistor; the driving circuit includes a driving transistor; the fourth transistor includes a fourth active pattern, and the fifth transistor includes a fifth active pattern, the sixth transistor includes a sixth active pattern, and the driving transistor includes a driving active pattern;

the fourth active pattern, the fifth active pattern, the sixth active pattern and the driving active pattern are formed of a second semiconductor layer;

The first semiconductor layer and the second semiconductor layer are different layers.

In a specific implementation, the fourth active pattern in the fourth transistor, the fifth active pattern in the fifth transistor, the sixth active pattern in the sixth transistor, and the driving active pattern in the driving transistor can be formed by the second semiconductor layer, and the second semiconductor layer may be made of P-Si (polysilicon), but not limited thereto.

Figure 6:
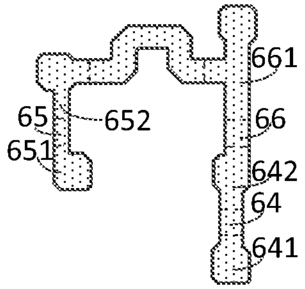
FIG. 6 is a schematic diagram of the second semiconductor layer in FIG. 18.

As shown in FIG. 6, the fourth active pattern includes a first fourth conductive portion 641, a fourth channel portion 64 and a second fourth conductive portion 642 arranged in sequence from bottom to top;

The second fourth conductive portion 642 is multiplexed as the second sixth conductive portion included in the sixth active pattern;

The sixth active pattern includes a second sixth conductive portion, a sixth channel portion 66 and a first sixth conductive portion 661 arranged in sequence from bottom to top; the first sixth conductive portion 661 is multiplexed as a second driving conductive portion included for driving active pattern;

The fifth active pattern includes a first fifth conductive portion 651, a fifth channel portion 65, and a second fifth conductive portion 652 that are sequentially arranged in a vertical direction from bottom to top;

The second fifth conductive portion 652 is multiplexed as the first driving conductive portion included in the driving active pattern;

Wherein, the first fourth conductive portion 641 is used as the first electrode S4 of T4, and the second fourth conductive portion 642 is used as the second electrode D4 of T4;

The second sixth conductive portion included in the sixth active pattern is used as the second electrode of T6; the first sixth conductive portion 661 is used as the first electrode S6 of T6; the second driving conductive portion included in the driving active pattern is used as the second electrode of TO; the first fifth conductive portion 651 is used as the first electrode S5 of T5, and the second fifth conductive portion 652 is used as the second electrode S5 of T5, the first driving conductive portion included in the driving active pattern is used as the first electrode of T0.

Figure 7:
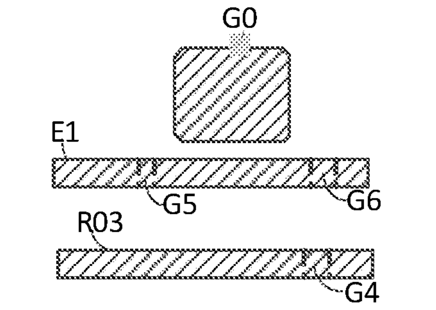
FIG. 7 is a schematic diagram of the first gate metal layer in FIG. 18.
Figure 8:
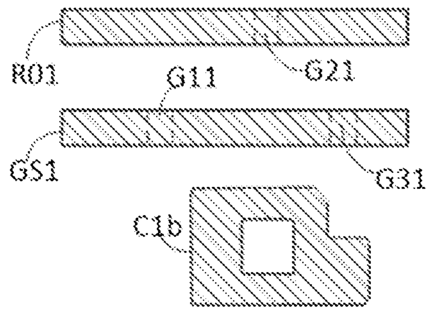
FIG. 8 is a schematic diagram of the second gate metal layer in FIG. 18.
Figure 18:
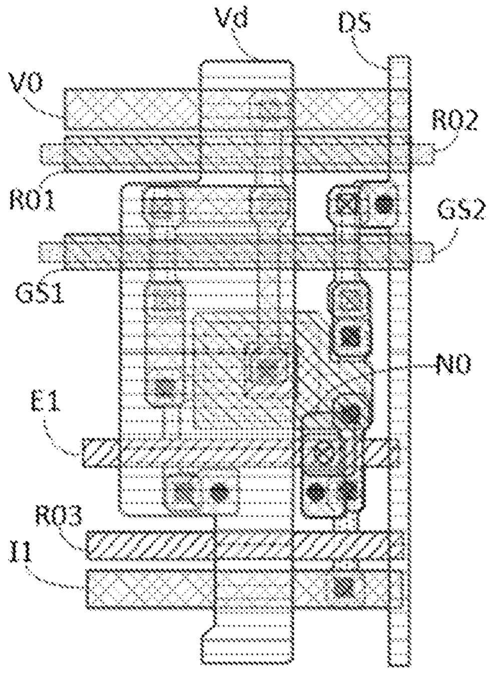
FIG. 18 and FIG. 19 are schematic diagrams of anodes added on the basis of FIG. 17.

FIG. 6 is a schematic diagram of the second semiconductor layer in FIG. 18; FIG. 7 is a schematic diagram of the first gate metal layer in FIG. 18, FIG. 8 is a schematic diagram of the second gate metal layer in FIG. 18; FIG. 9 is a schematic diagram of the first semiconductor layer in FIG.

Figure 10:
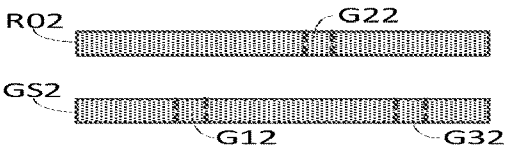
FIG. 10 is a schematic diagram of the third gate metal layer in FIG. 18.
Figure 11:
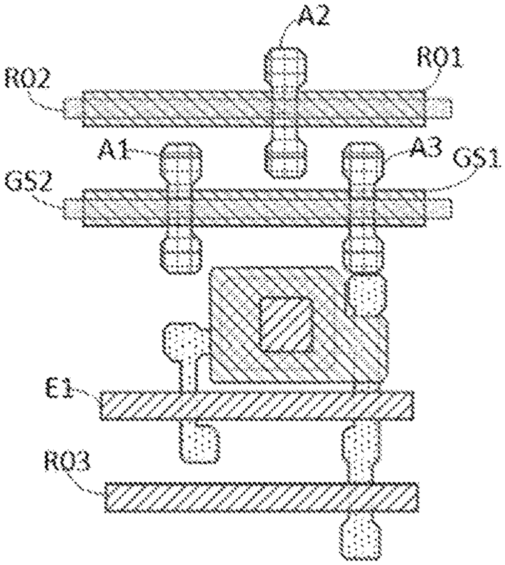
FIG. 11 is a schematic view of a stacking structure of FIGS. 6, 7, 8, 9 and 10.
Figure 12:
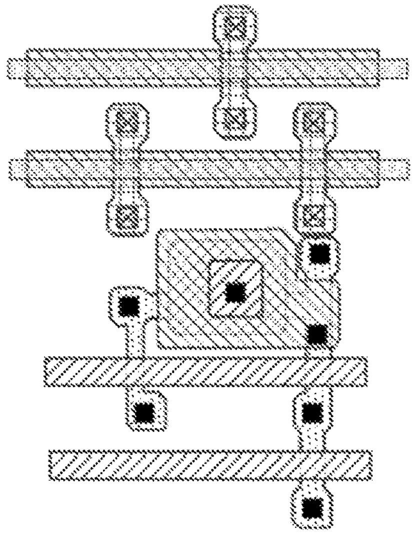
FIG. 12 is a schematic diagram of a via hole added on the basis of FIG. 11.
Figure 13:
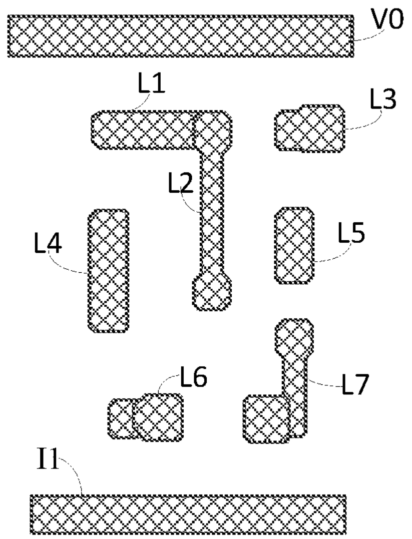
FIG. 13 is a schematic diagram of the first source-drain metal layer in FIG. 18.
Figure 14:
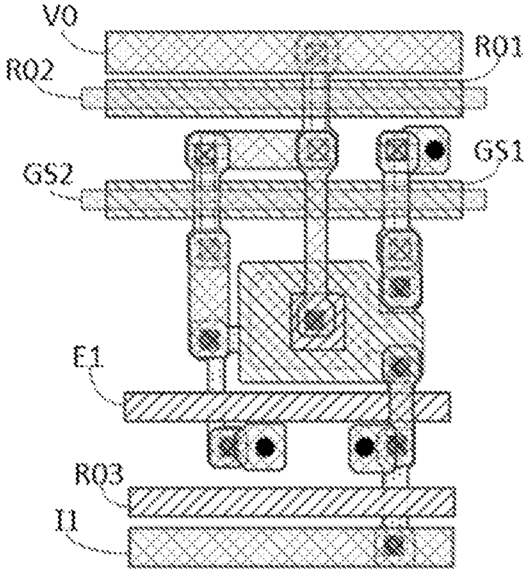
FIG. 14 is a schematic diagram of a via hole added on the basis of FIG. 12 and the first source-drain metal layer shown in FIG. 13.
Figure 15:
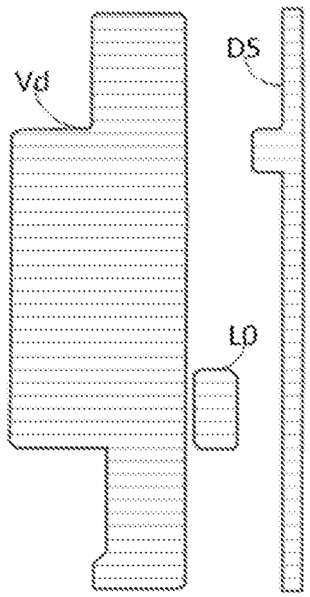
FIG. 15 is a schematic diagram of the second source-drain metal layer in FIG. 18.
Figure 16:
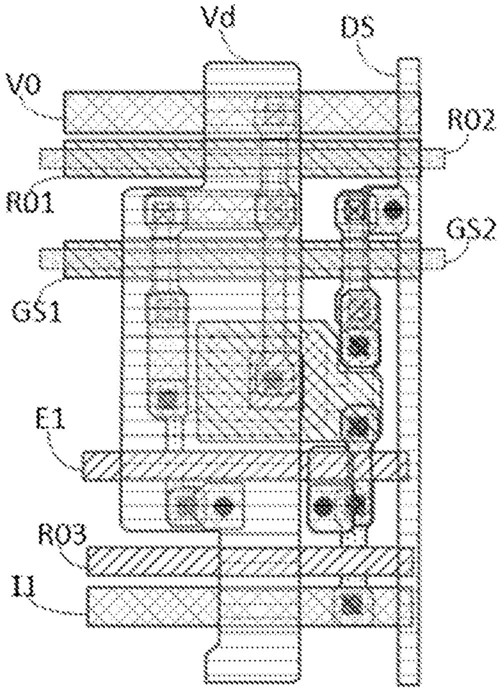
FIG. 16 is a schematic diagram of the second source-drain metal layer shown in FIG. 15 added on the basis of FIG. 14.
Figure 17:
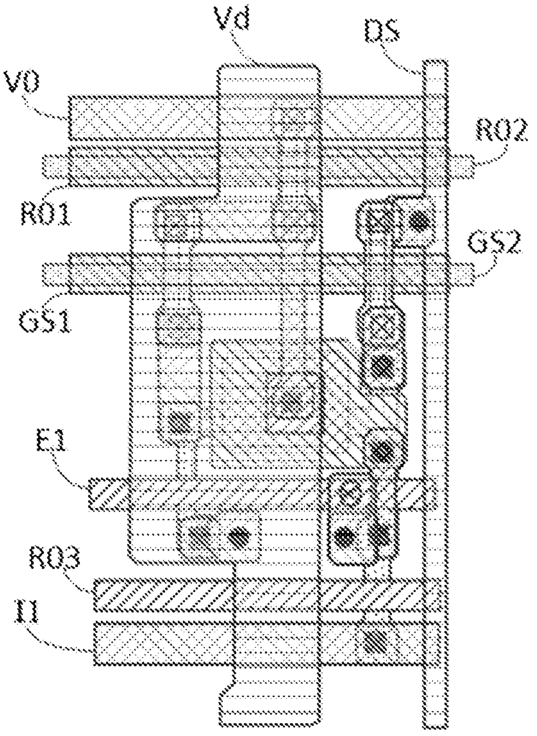
FIG. 17 is a schematic diagram of a via hole added on the basis of FIG. 16.

18; FIG. 10 is a schematic diagram of the third gate metal layer in FIG. 18; FIG. 11 is a schematic diagram of the stacking structure of FIGS. 6, 7, 8, 9 and 10; FIG. 12 is a schematic diagram of the via hole added on the basis of FIG. 11; FIG. 13 is a schematic diagram of the first source-drain metal layer in FIG. 18; FIG. 14 is a schematic diagram of the via hole added on the basis of FIG. 12 and the first source-drain metal layer shown in FIG. 13; FIG. 15 is a schematic diagram of the second source-drain metal layer in FIG. 18; FIG. 16 is a schematic diagram of the second source-drain metal layer shown in FIG. 15 added on the basis of FIG. 14; FIG. 17 is a schematic diagram of a via hole added on the basis of FIG. 16; FIG. 18 is a schematic diagram of an anode added on the basis of FIG. 17.

As shown in FIG. 11, the orthographic projection of R01 on the base substrate overlaps the orthographic projection of R02 on the base substrate, and the orthographic projection of GS1 on the base substrate overlaps the orthographic projection of GS2 on the base substrate.

In at least one embodiment of the present disclosure, the conductive portions on both sides of the channel portion of the transistor in the pixel circuit may respectively correspond to the first electrode and the second electrode of the transistor, or may be coupled to the first electrode and the second electrode of the transistor, respectively.

Optionally, the driving circuit includes a drive transistor, the energy storage circuit includes a storage capacitor; the compensation control circuit includes a first transistor; the data writing-in circuit includes a third transistor; the sub-pixel includes a first scan line and a first reset control line;

The first gate electrode of the first transistor, the first gate electrode of the third transistor and the first scan line form an integrated structure;

The first transistor includes a first active pattern, the third transistor includes a third active pattern, at least part of the first active pattern extends along the first direction, at least part of the third active pattern extends along a first direction; the first active pattern and the third active pattern are arranged along a second direction, and the second direction intersects the first direction;

The orthographic projection of at least part of the first active pattern on the based substrate is located between the orthographic projection of the first reset control line on the base substrate and the orthographic projection of the gate electrode of the driving transistor on the base substrate; the orthographic projection of at least part of the third active pattern on the base substrate is located between the orthographic projection of the first reset control line on the base substrate and the orthographic projection of the gate electrode of the driving transistor on the base substrate.

In at least one embodiment of the present disclosure, the first gate included in the first transistor, the first gate included in the third transistor, and the first scan line may be formed into an integrated structure, and the first gate included in the first transistor, the first gate included in the third transistor, and the first scan line can be formed on the second gate metal layer or the third gate metal layer (in specific implementation, a second semiconductor layer, a first insulating layer, a first gate metal layer, a second insulating layer, a second gate metal layer, a third insulating layer, a first semiconductor layer, a fourth insulating layer and a third gate metal layer are formed subsequently on the base substrate). When the first gate electrode included in the first transistor and the first gate electrode included in the third transistor are formed on the second gate metal layer, the first transistor and the third transistor adopt a bottom gate structure; when the first gate electrode included in the first transistor and the first gate electrode included in the third transistor are formed in the third gate metal layer, the first transistor and the third transistor adopt a top gate structure.

As shown in FIG. 9, at least part of the first active pattern A1 extends along the first direction, and at least part of the third active pattern A3 extends along the first direction; the first active pattern A1 and the third active pattern A3 are arranged along a second direction, and the second direction intersects with the first direction;

As shown in FIGS. 6-18, the first reset control line R01 may be formed on the second gate metal layer, and the orthographic projection of at least part of the first active pattern A1 on the base substrate is located between the orthographic projection of the first reset control line R01 on the base substrate and the orthographic projection of the gate electrode G0 of the driving transistor on the base substrate; the orthographic projection of at least part of the third active pattern A3 on the base substrate is located between the orthographic projection of the first reset control line R01 on the base substrate and the orthographic projection of the gate electrode G0 of the driving transistor on the base substrate.

As shown in FIG. 8, the first gate electrode G11 included in T1 and the first gate electrode G31 included in T3 and the first scan line GS1 are formed into an integrated structure, and G11, G31 and GS1 are formed in the second gate metal layer.

In the layout shown in FIGS. 6-18, the first direction may be a vertical direction, and the second direction may be a horizontal direction, but not limited thereto.

In at least one embodiment of the present disclosure, the first reset control line, the first scan line and the second electrode plate of the storage capacitor are located in the same layer; the sub-pixel further includes a second reset control line and a second scan line arranged in the same layer; the first reset control line and the second reset control line are located at different layers;

The second gate electrode of the first transistor, the second gate electrode of the third transistor and the second scan line form an integral structure.

In at least one embodiment of the present disclosure, the second gate electrode included in the first transistor, the second gate electrode included in the third transistor, and the second scan line may be formed into an integrated structure, and the second gate electrode included in the first transistor, the second gate electrode included in the third transistor, and the second scan line may be formed on the third gate metal layer or the second gate metal layer.

Optionally, the first gate electrode included in the first transistor, the first gate electrode included in the third transistor, and the first scan line may form a second gate metal layer, and the second gate electrode included in the first transistor and the second gate electrode included in the third transistor and the second scan line may form a third gate metal layer; alternatively, the first gate electrode included in the first transistor, the first gate electrode included in the third transistor and the first scan line may form a third gate metal layer, and the second gate electrode included in the first transistor and the second gate electrode included in the third transistor and the second scan line may form a second gate metal layer. In the schematic diagrams of the layout shown in FIGS. 6-18 of the present disclosure, the first scan line is formed on the second gate metal layer, and the second scan line is formed on the third gate metal layer.

As shown in FIG. 10, the second gate electrode G12 included in T1, the second gate electrode G32 included in T3 and the second scan line GS2 are formed into an integrated structure, and G12, G32 and GS2 are formed on the third gate metal layer.

In the layout embodiment of FIGS. 6-18, two scan lines are used: the first scan line and the second scan line, and three set control lines are used: a first set control line, a second set control line and a third set control line. As shown in FIGS. 8 and 10, the orthographic projection of the first scan line GS1 on the base substrate at least partially overlaps the orthographic projection of the second scan line GS2 on the base substrate, and the orthographic projection of the first reset control line R1 on the base substrate at least partially overlaps the orthographic projection of the second reset control line R2 on the base substrate, but not limited thereto.

Optionally, the first reset control line is located between the second semiconductor layer and the base substrate, and the second reset control line is located on a side of the second semiconductor layer away from the base substrate.

In at least one embodiment of the present disclosure, as shown in FIG. 8 and FIG. 10, the orthographic projection of the first gate electrode G11 of the first transistor on the base substrate at least partially overlaps the orthographic projection of the second gate electrode G12 of the first transistor on the base substrate, the orthographic projection of the first gate electrode G31 of the third transistor on the base substrate at least partially overlaps the orthographic projection of the second gate electrode G32 of the third transistor on the base substrate.

Optionally, the sub-pixel further includes a reference voltage line; the first reset circuit includes a second transistor;

The second transistor includes a second active pattern; at least part of the second active pattern extends in a first direction, and an orthographic projection of at least part of the second active pattern on the base substrate is located between the orthographic projection of the reference voltage line on the base substrate and the orthographic projection of the first scan line on the base substrate; the first gate electrode of the second transistor and the first reset control line form an integrated structure;

The first electrode of the second transistor is electrically connected to the reference voltage line, and the second electrode of the second transistor is electrically connected to the gate electrode of the driving transistor.

In at least one embodiment of the present disclosure, the first gate electrode of the second transistor may be formed on the second gate metal layer or the third gate metal layer.

In a specific implementation, as shown in FIG. 13, the sub-pixel may further include a reference voltage line V0; the first reset circuit includes a second transistor;

As shown in FIG. 8, FIG. 9 and FIG. 13, the second transistor includes a second active pattern A2; at least part of the second active pattern A2 extends along the first direction, and the orthographic projection of the second active pattern A2 on the base substrate is located between the orthographic projection of the reference voltage line V0 on the base substrate and the orthographic projection of the first scan line R01 on the base substrate; the first gate electrode G21 of the second transistor and the first reset control line R01 form an integrated structure;

The first electrode of the second transistor is electrically connected to the reference voltage line, and the second electrode of the second transistor is electrically connected to the gate electrode of the driving transistor.

As shown in FIG. 9, A1 includes a first first conductive portion A11, a first channel portion A10 and a second first conductive portion A12 arranged in sequence from top to bottom;

A2 includes a first second conductive portion A21, a second channel portion A20 and a second second conductive portion A22 arranged in sequence from top to bottom;

A3 includes a first third conductive portion A31, a third channel portion A30 and a second third conductive portion A32 arranged in sequence from top to bottom;

A11 is used as the first electrode S1 of T1, A12 is used as the second electrode D1 of T1; A21 is used as the first electrode S2 of T2, A22 is used as the second electrode D2 of T2; A31 is used as the first electrode S3 of T3, A32 is used as the second electrode D3 of T3.

As shown in FIG. 6-FIG. 18, A21 is electrically connected to V0 through a via hole, A22 is electrically connected to a second conductive connection portion L2 through a via hole, and the second conductive connection portion L2 is electrically connected to the gate electrode G0 of the driving transistor through a via hole;

The second conductive connection portion L2 is formed on the first source-drain metal layer (in a specific implementation, a first interlayer dielectric layer, a second interlayer dielectric layer, a first source-drain metal layer, a passivation layer, a first planarization layer, a second source-drain metal layer, a second planarization layer and an anode layer may be arranged in sequence on a side of the third gate metal layer away from the substrate).

Optionally, the first reset control line, the first scan line and the second electrode plate of the storage capacitor are located on the same layer; the sub-pixel further includes a second reset control line and a second scan line located at the same layer; the first reset control line and the second reset control line are located at different layers;

The second gate electrode of the second transistor and the second reset control line form an integral structure.

In a specific implementation, the second transistor may further include a second gate electrode, and the second gate electrode of the second transistor and the second reset control line form an integral structure;

When the first gate electrode of the second transistor is formed on the second gate metal layer, the second gate electrode of the second transistor may be formed on the third gate metal layer; when the first gate electrode of the second transistor is formed on the third gate metal layer, the second gate electrode of the second transistor may be formed on the second gate metal layer.

In the layout shown in FIGS. 6 to 18, the second gate electrode G22 of the second transistor is formed on the third gate metal layer. As shown in FIG. 10, the second electrode of the second transistor and the second reset control line R02 form an integrated structure.

In at least one embodiment of the present disclosure, an orthographic projection of the first gate electrode of the second transistor on the base substrate at least partially overlaps an orthographic projection of the second gate electrode of the second transistor on the base substrate, but not limited to.

As shown in FIG. 8 and FIG. 10, the orthographic projection of the first gate electrode G21 of the second transistor on the base substrate overlaps the orthographic projection of the second gate electrode G22 of the second transistor on the base substrate, but not limited to.

As shown in FIG. 8 and FIG. 10, the orthographic projection of R01 on the base substrate overlaps the orthographic projection of R02 on the base substrate, and the orthographic projection of GS1 on the base substrate overlaps the orthographic projection of GS2 on the base substrate, but not limited thereto.

Optionally, the compensation control circuit includes a first transistor; the pixel circuit further includes a second transistor; the sub-pixel further includes a first voltage line; the first transistor includes a first active pattern; the second transistor including a second active pattern;

The orthographic projection of the first voltage line on the base substrate covers the orthographic projection of the first active pattern on the base substrate and the orthographic projection of the second active pattern on the base substrate;

The first electrode of the first transistor and the second electrode of the second transistor are electrically connected through a first conductive connection portion, and the orthographic projection of the first voltage line on the base substrate covers the orthographic projection of the first conductive connection portion on the base substrate;

The first voltage line is arranged on a side of the first electrode of the first transistor away from the base substrate.

In at least one embodiment of the present disclosure, the first voltage line may be formed on the second source-drain metal layer, and the orthographic projection of the first voltage line on the base substrate covers the orthographic projection of the first active pattern on the base substrate, the orthographic projection of the second active pattern on the base substrate, the orthographic projection of the first voltage line on the base substrate covers the orthographic projection of the first conductive connection portion on the substrate, and the first voltage line can cover a key node (the key node may be the first node), and cover the first active pattern and the second active pattern, so as to protect the first node, the first active pattern and the second active pattern.

In the schematic diagrams of the layouts shown in FIGS. 6 to 18, the first voltage line is the high voltage line Vd.

As shown in FIG. 6 to FIG. 18, A11 is electrically connected to the first conductive connection portion L1 through a via hole, and A22 is electrically connected to the first conductive connection portion L1 through a via hole, that is, A11 and A22 are electrically connected through the first conductive connection portion L1, the first conductive connection portion L1 is coupled to the second conductive connection portion L2, and both L1 and L2 are formed in the first source-drain metal layer;

The orthographic projection of Vd on the base substrate covers the orthographic projection of A1 on the base substrate, the orthographic projection of Vd on the base substrate covers the orthographic projection of A2 on the base substrate, and the orthographic projection of Vd on the base substrate covers the orthographic projection of L1 on the base substrate.

In FIG. 7, the gate electrode of the driving transistor T0 is labeled G0, G0 is multiplexed as the first electrode plate of the storage capacitor C1, the gate electrode of T4 is labeled G4, the gate electrode of T5 is labeled G5, the gate electrode of T6 is labeled G6, the third reset control line is labeled R03, and the light-emitting control line is labeled E1.

In FIG. 8, the second electrode plate of C1 is labeled C1*b*.

In FIG. 13, the third conductive connection portion is labeled L3, the fourth conductive connection portion is labeled L4, the fifth conductive connection portion is labeled L5, and the sixth conductive connection portion is labeled L6, the seventh conductive connection portion is labeled L7, and I1 is the initial voltage line.

In FIG. 15, the data line is labeled DS, the high voltage line is labeled Vd, and the connection conductive portion is labeled L0.

As shown in FIGS. 6 to 18, when fabricating the display substrate according to at least one embodiment of the present disclosure, a second semiconductor layer may be formed on the base substrate first, and a patterning process may be performed on the second semiconductor layer to form the fourth active pattern in the fourth transistor, the fifth active pattern in the fifth transistor, the sixth active pattern in the sixth transistor, and the driving active pattern in the driving transistor;

Forming a first insulating layer on the side of the second semiconductor layer away from the base substrate;

Forming a first gate metal layer on the side of the first insulating layer away from the base substrate, and performing a patterning process on the first gate metal layer to form the gate electrode of the driving transistor, the light-emitting control line and the third reset control line;

Forming a second insulating layer on the side of the first gate metal layer away from the base substrate;

Forming a second gate metal layer on the side of the second insulating layer away from the first gate metal layer, and performing a patterning process on the second gate metal layer to form a first reset control line, a first scan line and the second electrode plate of the storage capacitor;

Forming a third insulating layer on the side of the second gate metal layer away from the second insulating layer;

Forming a first semiconductor layer on the side of the third insulating layer away from the second gate metal layer, and performing a patterning process on the first semiconductor layer to form a first active pattern, a second active pattern and a third active pattern;

Forming a fourth insulating layer on the side of the first semiconductor layer away from the third insulating layer;

Forming a third gate metal layer on the side of the fourth insulating layer away from the first semiconductor layer; performing a patterning process on the third gate metal layer to form a second scan line and a second reset control line;

Forming a first interlayer dielectric layer and a second interlayer dielectric layer sequentially on the side of the third gate metal layer away from the first semiconductor layer;

Forming a via hole on the display substrate provided with the second interlayer dielectric layer;

Forming a first source-drain metal layer on the side of the second interlayer dielectric layer away from the third gate metal layer, and performing a patterning process on the first source-drain metal layer to form a first conductive connection portion, a second conductive connection portion, a third conductive connection portion, a fourth conductive connection portion, a fifth conductive connection portion, a sixth conductive connection portion, a seventh conductive connection portion, an initial voltage line and a reference voltage line;

Forming a passivation layer and a first planarization layer sequentially on the side of the first source-drain metal layer away from the third gate metal layer;

Forming a via hole on the display substrate provided with the first planarization layer;

Forming a second source-drain metal layer on the side of the first planarization layer away from the first source-drain metal layer; performing a patterning process on the second source-drain metal layer to form the data line, the high voltage line and the conductive connection portion;

Forming a second planarization layer on the side of the second source-drain metal layer away from the first source-drain metal layer;

Forming a via hole on the display substrate provided with the second planarization layer;

Forming an anode layer on the side of the second planarization layer away from the first source-drain metal layer.

In FIG. 12, the black rectangular block marks the via hole, and the via hole marked by the black rectangular block is formed after forming the second semiconductor layer, the first insulating layer, the first gate metal layer, the second insulating layer, the second gate metal layer, the third insulating layer, the first semiconductor layer, the fourth insulating layer, the third gate metal layer, the first interlayer dielectric layer and the second interlayer dielectric layer;

The icon with the cross in the box shows the via hole, and the via hole marked by the icon with the cross in the box is formed after forming the second semiconductor layer, the first insulating layer, the first gate metal layer, the second insulating layer, the second gate metal layer, the third insulating layer, the first semiconductor layer, the fourth insulating layer, the third gate metal layer, the first interlayer dielectric layer and the second interlayer dielectric layer.

In FIG. 14, the black circle blocks indicate the via hole penetrating the passivation layer and the first planarization layer.

In FIG. 17, the icons with a cross in the circle indicate the via hole, and via hole marked by the icons with a cross in the circle is the via hole penetrating the second planarization layer.

As shown in FIG. 6 to FIG. 18, A21 is electrically connected to V0 through the via hole, A12 is electrically connected to L4 through the via hole, and L4 is electrically connected to the second fifth conductive portion 652 through the via hole; A31 is electrically connected to the second fifth conductive portion 652 through the via hole, and the A32 is electrically connected to the first sixth conductive portion 661 through the via hole.

As shown in FIG. 6 to FIG. 18, the first fifth conductive portion 651 is electrically connected to L6 through the via hole, and the L6 is electrically connected to the high voltage line Vd through the via hole;

The second fourth conductive portion 642 is electrically connected to C1*b* through a via hole;

I1 is electrically connected to the first fourth conductive portion 641 through a via hole;

The second fourth conductive portion 642 is electrically connected to the connection conductive portion L0 through the via hole, and the connection conductive portion L0 is electrically connected to the anode NO through the via hole, so that the second fourth conductive portion 642 is electrically connected to the anode N0.

Figure 19:
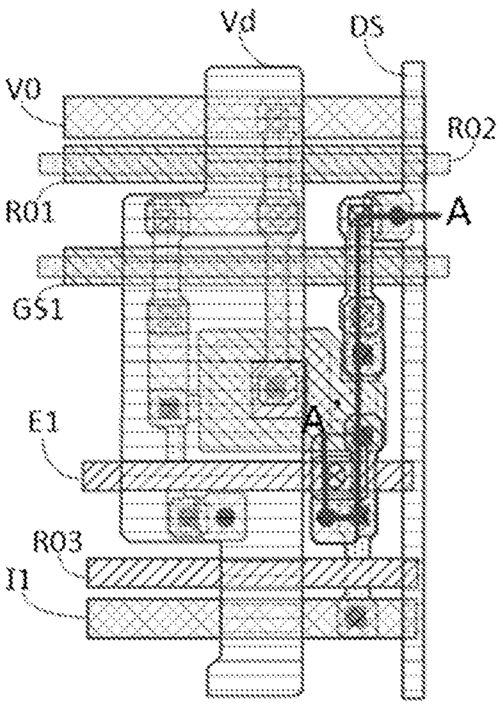

FIG. 18 and FIG. 19 are schematic diagrams of an anode added to FIG. 17, and FIG. 19 shows a cross-sectional line A-A'.

Figure 20:
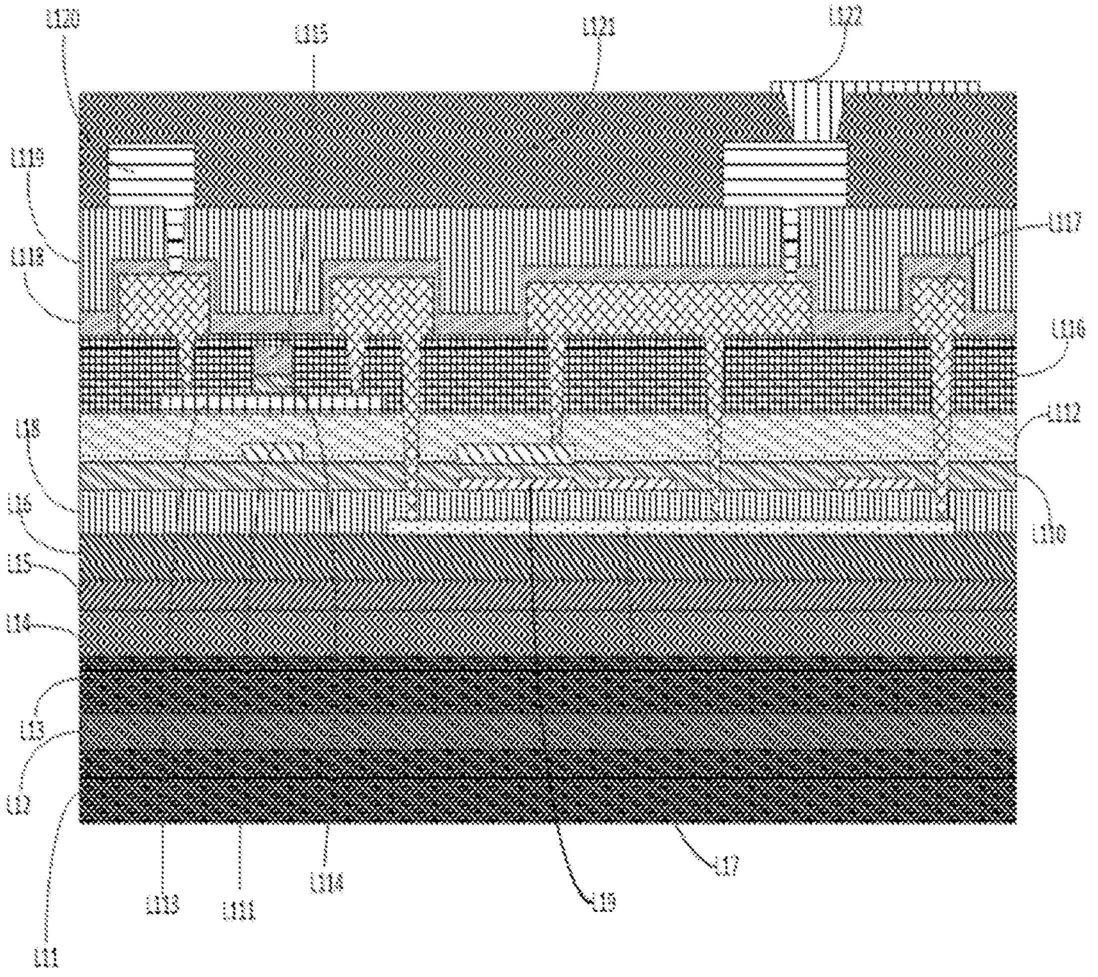
FIGS. 20 and 21 are cross-sectional views of FIG. 19 along section line A-A'.
Figure 21:
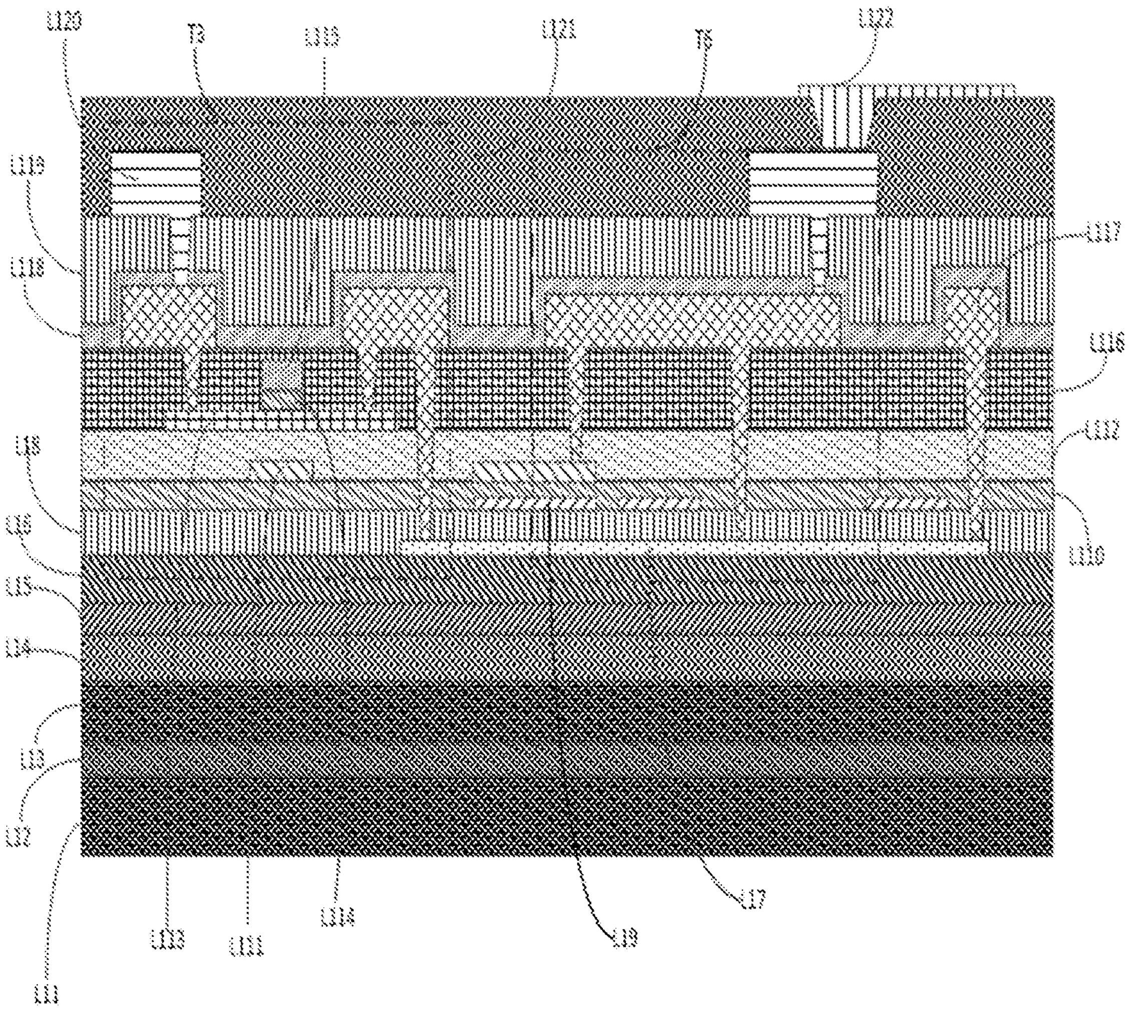

FIGS. 20 and 21 are cross-sectional views of FIG. 19 along section line A-A'; T3 and T6 are indicated in FIG. 21.

In FIG. 20 and FIG. 21, the first substrate is labeled L11, the first protective layer is labeled L12, the second substrate is labeled L13, the second protective layer is labeled L14, and the first buffer layer is labeled L15, the second buffer layer is labeled L16, the second semiconductor layer is labeled L17, the first gate insulating layer is labeled L18, the first gate metal layer is labeled L19, the second gate insulating layer is labeled L110, the second gate metal layer is labeled L111, the third buffer layer is labeled L112, the first semiconductor layer is labeled L113, the third gate insulating layer is labeled L114, the third gate metal layer is labeled L115, the interlayer dielectric layer is labeled L116, the first source-drain metal layer is labeled L117, the passivation layer is labeled L118, and the first planarization layer is labeled L119, the second source-drain metal layer is labeled L120, the second planarization layer is labeled L121, the anode layer is labeled L122.

As shown in FIG. 21, T3 adopts a top gate and a bottom gate, the top gate is formed on the third gate metal layer L115, and the bottom gate is formed on the second gate metal layer L111;

The second electrode of T6 is electrically connected to the anode of the organic light-emitting diode O1, and the anode of O1 is formed in the anode layer L122; and the second electrode of T6 is electrically connected to the second electrode plate of C1, and the second electrode plate of C1 can be formed on the second gate metal layer L111.

In at least one embodiment of the present disclosure, the first buffer layer L15, the second buffer layer L16, the first gate insulating layer L18, the second gate insulating layer L110, the third buffer layer L112, the third gate insulating layer L114, the interlayer dielectric layer L116 and the passivation layer L118 may be inorganic layers, for example, the inorganic layers may be one or more layers of silicon nitride, silicon oxide, and silicon oxynitride;

The first planarization layer L119 and the second planarization layer L121 may be organic layers, for example, the organic layers may be PI (polyimide) layers;

The first substrate L11 and the second substrate L13 may be made of PI; but not limited thereto.

In at least one embodiment of the present disclosure, the light-emitting control lines included in the sub-pixels in the same row are electrically connected to each other and form an integrated structure;

The first reset control lines included in the sub-pixels in the same row are electrically connected to each other and form an integrated structure;

The second reset control lines included in the sub-pixels in the same row are electrically connected to each other and form an integrated structure;

The third reset control lines included in the sub-pixels located in the same row are electrically connected to each other and form an integrated structure;

The first scan lines included in the sub-pixels located in the same row are electrically connected to each other and form an integrated structure;

The second scan lines included in the sub-pixels located in the same row are electrically connected to each other and form an integrated structure;

The initial voltage lines included in the sub-pixels located in the same row are electrically connected to each other and form an integrated structure;

The reference voltage lines included in the sub-pixels in the same row are electrically connected to each other and form an integrated structure;

The data lines included in the sub-pixels located in the same column are electrically connected to each other and form an integrated structure;

The high voltage lines included in the sub-pixels located in the same column are electrically connected to each other and form an integrated structure.

Figure 22:
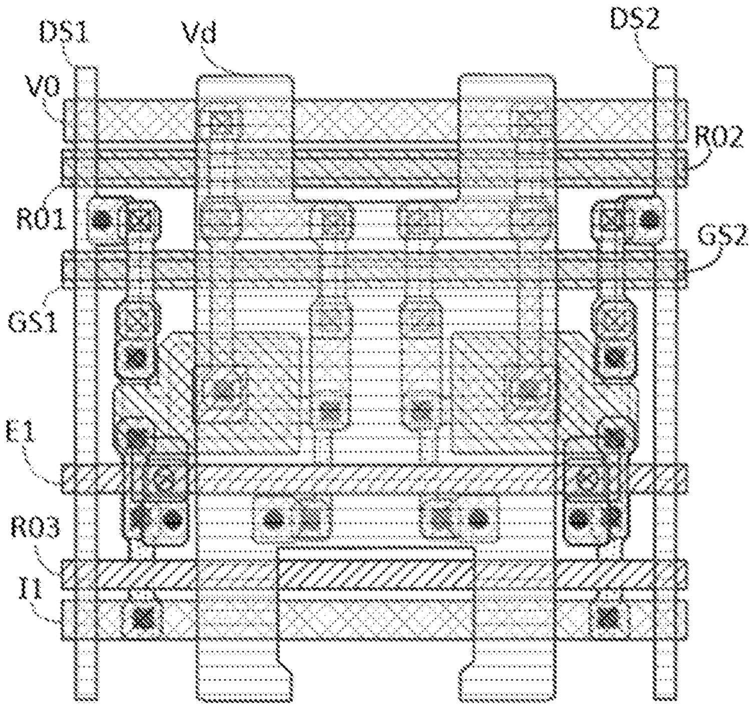
FIG. 22 is a structural diagram of two pixel circuits arranged in mirror image.
Figure 23:
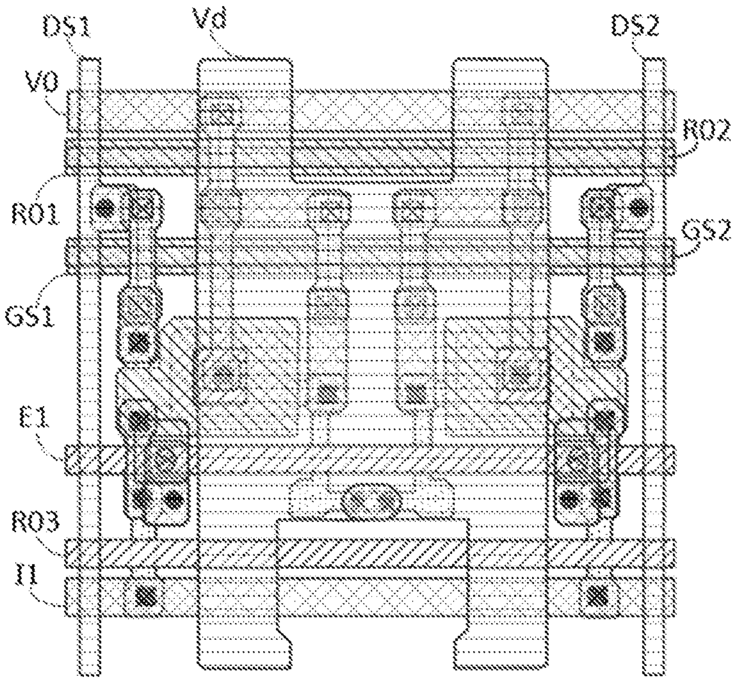
FIG. 23 is a structural diagram of two pixel circuit arranged in mirror image.

FIGS. 22 and 23 show schematic structural diagrams of two pixel circuits arranged in mirror images.

As shown in FIG. 22 and FIG. 23, the two pixel circuits share the high voltage line Vd, the first reset control line R01, the second reset control line R02, the reference voltage line V0, the first scan line GS1, the second scan line GS2, the light-emitting control line E1, the third reset control line R03 and the initial voltage line I1; the pixel circuit on the left is electrically connected to the first data line DS1, and the pixel circuit on the right is electrically connected to the second data line DS2.

The difference between FIG. 23 and FIG. 22 is that:

In FIG. 22, in each pixel circuit, the fifth active pattern in the fifth transistor is electrically connected to the sixth conductive connection portion through the via hole, and the sixth conductive connection portion is electrically connected to the high voltage line Vd through the via hole, that is, the fifth active pattern in the fifth transistor is electrically connected to the high voltage line Vd through two via holes;

In FIG. 23, the fifth active patterns in the two pixel circuits are continuous with each other, and the fifth active patterns are electrically connected to the high voltage line Vd through two via holes;

Compared with FIG. 22, two via holes for electrically connecting the fifth active pattern and the high voltage line Vd is not used in FIG. 23.

In FIG. 23, the via hole for electrically connecting the fifth active pattern and the high voltage line Vd may not be centrally arranged, and the via hole is also arranged on the left or right side.

The display device according to the embodiment of the present disclosure includes the above-mentioned display substrate.

In the embodiments of the present disclosure, the display device may be any product or member having a display function, e.g., mobile phone, tablet computer, television, display, laptop computer, digital photo frame or navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

The invention claimed is:

1. A pixel circuit, comprising a light-emitting element, a driving circuit, a compensation control circuit, a data writing-in circuit, a first reset circuit, a light-emitting control circuit and an energy storage circuit; wherein the compensation control circuit is electrically connected to a scan line, a control end of the driving circuit and a first end of the driving circuit respectively, and is configured to control to connect the control end of the driving circuit and the first end of the driving circuit under the control of a scan signal provided by the scan line;

the data writing-in circuit is electrically connected to the scan line, a data line and a second end of the driving circuit respectively, and is configured to write a data voltage on the data line into the second end of the driving circuit under the control of the scan signal;

the first reset circuit is electrically connected to a reset control line, a reference voltage line and the control end of the driving circuit, respectively, is configured to write a reference voltage provided by the reference voltage line into the control end of the driving circuit under the control of a reset control signal provided by the reset control line;

the light-emitting control circuit is respectively electrically connected to a light-emitting control line, the second end of the driving circuit and a first electrode of the light-emitting element, and is configured to control to connect the second end of the driving circuit and the first electrode of the light-emitting element under the control of a light-emitting control signal provided by the light-emitting control line;

the energy storage circuit is respectively electrically connected to the control end of the driving circuit and the first electrode of the light-emitting element, and is configured to store electrical energy;

the driving circuit is configured to control to connect the first end of the driving circuit and the second end of the driving circuit under the control of the control end of the driving circuit.

2. The pixel circuit according to claim 1, wherein the compensation control circuit comprises a first transistor;

a gate electrode of the first transistor is electrically connected to the scan line, a first electrode of the first transistor is electrically connected to the control end of the driving circuit, and a second electrode of the first transistor is electrically connected to the first end of the driving circuit;

the first reset circuit includes a second transistor;

a gate electrode of the second transistor is electrically connected to the reset control line, a first electrode of the second transistor is electrically connected to the reference voltage line, and a second electrode of the second transistor is electrically connected to the control end of the driving circuit;

the data writing-in circuit includes a third transistor;

a gate electrode of the third transistor is electrically connected to the scan line, a first electrode of the third transistor is electrically connected to the data line, and a second electrode of the third transistor is electrically connected to the second end of the driving circuit.

3. The pixel circuit according to claim 2, wherein the first transistor and/or the second transistor are metal oxide thin film transistors; and/or the third transistor is a metal oxide thin film transistor.

4. The pixel circuit according to claim 1, wherein the energy storage circuit comprises a storage capacitor;

a first electrode plate of the storage capacitor is electrically connected to the control end of the driving circuit, and a second electrode plate of the storage capacitor is electrically connected to the first electrode of the light-emitting element.

5. The pixel circuit according to claim 1, further comprising a second reset circuit; wherein the second reset circuit is respectively electrically connected to the reset control line, an initial voltage line and the first electrode of the light-emitting element, and is configured to write an initial voltage provided by the initial voltage line into the first electrode of the light-emitting element under the control of the reset control signal wherein the second reset circuit comprises a fourth transistor;

a gate electrode of the fourth transistor is electrically connected to the reset control line, a first electrode of the fourth transistor is electrically connected to the initial voltage line, and a second electrode of the fourth transistor is electrically connected to the first electrode of the light-emitting element.

6. The pixel circuit according to claim 1, wherein the light-emitting control circuit is also electrically connected to a first voltage line and the first end of the driving circuit, is configured to control to connect the first voltage line and the first end of the driving circuit under the control of the light-emitting control signal, wherein the light-emitting control circuit comprises a fifth transistor and a sixth transistor;

a gate electrode of the fifth transistor is electrically connected to the light-emitting control line, a first electrode of the fifth transistor is electrically connected to the first voltage line, and a second electrode of the fifth transistor is electrically connected to the first end of the driving circuit;

a gate electrode of the sixth transistor is electrically connected to the light-emitting control line, a first electrode of the sixth transistor is electrically connected to the second end of the driving circuit, and a second electrode of the sixth transistor is electrically connected to the first electrode of the light-emitting element;

a second electrode of the light-emitting element is electrically connected to a second voltage lin.

7. The pixel circuit according to claim 1, wherein the driving circuit comprises a driving transistor;

a gate electrode of the driving transistor is electrically connected to the control end of the driving circuit, a first electrode of the driving transistor is electrically connected to the first end of the driving circuit, and a second electrode of the driving transistor is electrically connected to the second end of the driving circuit.

8. A display substrate comprising a base substrate and a plurality of sub-pixels arranged on the base substrate, wherein the sub-pixel comprises the pixel circuit according to claim 1.

9. The display substrate according to claim 8, wherein the compensation control circuit includes a first transistor, the first reset circuit includes a second transistor, and the data writing-in circuit includes a third transistor; the first transistor includes a first active pattern, and the second transistor includes a second active pattern, the third transistor includes a third active pattern; the first active pattern, the second active pattern and the third active pattern are formed by a same semiconductor layer; the semiconductor layer is made of a metal oxide material.

10. The display substrate according to claim 9, wherein the semiconductor layer is a first semiconductor layer; the pixel circuit further includes a second reset circuit; the second reset circuit includes a fourth transistor; the light-emitting control circuit includes a fifth transistor and a sixth transistor; the driving circuit includes a driving transistor; the fourth transistor includes a fourth active pattern, and the fifth transistor includes a fifth active pattern, the sixth transistor includes a sixth active pattern, and the driving transistor includes a driving active pattern;

the fourth active pattern, the fifth active pattern, the sixth active pattern and the driving active pattern are formed of a second semiconductor layer;

the first semiconductor layer and the second semiconductor layer are different layers.

11. The display substrate according to claim 8, wherein the driving circuit includes a driving transistor, the energy storage circuit includes a storage capacitor; the compensation control circuit includes a first transistor; the data writing-in circuit includes a third transistor; the sub-pixel includes a first scan line and a first reset control line;

a first gate electrode of the first transistor, a first gate electrode of the third transistor and the first scan line form an integrated structure;

the first transistor includes a first active pattern, the third transistor includes a third active pattern, at least part of the first active pattern extends along a first direction, at least part of the third active pattern extends along a first direction; the first active pattern and the third active pattern are arranged along a second direction, and the second direction intersects the first direction;

an orthographic projection of the at least part of the first active pattern on the based substrate is located between an orthographic projection of the first reset control line on the base substrate and an orthographic projection of the gate electrode of the driving transistor on the base substrate; an orthographic projection of the at least part of the third active pattern on the base substrate is located between the orthographic projection of the first reset control line on the base substrate and the orthographic projection of the gate electrode of the driving transistor on the base substrate.

12. The display substrate according to claim 11, wherein the first reset control line, the first scan line and the second electrode plate of the storage capacitor are located at a same layer; the sub-pixel further includes a second reset control line and a second scan line arranged at a same layer; the first reset control line and the second reset control line are located at different layers;

a second gate electrode of the first transistor, a second gate electrode of the third transistor and the second scan line form an integral structure.

13. The display substrate according to claim 12, wherein the first reset control line is located between the second semiconductor layer and the base substrate, and the second reset control line is located on a side of the second semiconductor layer away from the base substrate or wherein an orthographic projection of the first gate electrode of the first transistor on the base substrate at least partially overlaps an orthographic projection of the second gate electrode of the first transistor on the base substrate, an orthographic projection of the first gate electrode of the third transistor on the base substrate at least partially overlaps an orthographic projection of the second gate electrode of the third transistor on the base substrate.

14. The display substrate according to claim 11, wherein the sub-pixel further comprises a reference voltage line; the first reset circuit comprises a second transistor;

the second transistor includes a second active pattern; at least part of the second active pattern extends in the first direction, and an orthographic projection of the at least part of the second active pattern on the base substrate is located between an orthographic projection of the reference voltage line on the base substrate and an orthographic projection of the first scan line on the base substrate; the first gate electrode of the second transistor and the first reset control line form an integrated structure;

a first electrode of the second transistor is electrically connected to the reference voltage line, and a second electrode of the second transistor is electrically connected to the gate electrode of the driving transistor.

15. The display substrate according to claim 14, wherein the first reset control line, the first scan line and the second electrode plate of the storage capacitor are located at a same layer; the sub-pixel further includes a second reset control line and a second scan line located at a same layer; the first reset control line and the second reset control line are located at different layers;

the second gate electrode of the second transistor and the second reset control line form an integral structure, wherein an orthographic projection of the first gate electrode of the second transistor on the base substrate at least partially overlaps an orthographic projection of the second gate electrode of the second transistor on the base substrate.

16. The display substrate according to claim 8, wherein the compensation control circuit includes a first transistor; the pixel circuit further includes a second transistor; the sub-pixel further includes a first voltage line; the first transistor includes a first active pattern; the second transistor includes a second active pattern;

an orthographic projection of the first voltage line on the base substrate covers an orthographic projection of the first active pattern on the base substrate and an orthographic projection of the second active pattern on the base substrate;

a first electrode of the first transistor and a second electrode of the second transistor are electrically connected through a first conductive connection portion, and the orthographic projection of the first voltage line on the base substrate covers an orthographic projection of the first conductive connection portion on the base substrate;

the first voltage line is arranged on a side of the first electrode of the first transistor away from the base substrate.

17. A display device comprising the display substrate according to claim 8.

18. A driving method, applied to the pixel circuit according to claim 1, wherein a display period comprises a reset phase, a compensation phase and a light-emitting phase; the driving method comprises:

in the reset phase, writing, by the first reset circuit, the reference voltage into the control end of the driving circuit under the control of the reset control signal; at the beginning of the compensation phase, controlling, by the driving circuit, to connect the first end of the driving circuit and the second end of the driving circuit under the control of a potential of the control end of the driving circuit;

in the compensation phase, controlling, by the compensation control circuit, to connect the control end of the driving circuit and the first end of the driving circuit under the control of the scan signal, and writing, by the data writing-in circuit, the data voltage on the data line into the second end of the driving circuit under the control of the scan signal;

at the beginning of the compensation phase, controlling, by the driving circuit, to connect the first end of the driving circuit and the second end of the driving circuit under the control of the potential of the control end of the driving circuit, to charge the energy storage circuit through the data voltage on the data line until the driving circuit disconnects the first end of the driving circuit from the second end of the driving circuit;

in the light-emitting phase, controlling, by the light-emitting control circuit, to connect the second end of the driving circuit and the first electrode of the light-emitting element under the control of the light-emitting control signal.

19. The driving method according to claim 18, wherein the light-emitting control circuit is further electrically connected to a first voltage line and the first end of the driving circuit, the driving method further comprises:

in the light-emitting phase, controlling, by the light-emitting control circuit, to connect the first voltage line and the first end of the driving circuit under the control of the light-emitting control signal.

20. The driving method according to claim 18, wherein the pixel circuit further comprises a second reset circuit, the driving method further comprises:

in the reset phase, writing, by the second reset circuit, an initial voltage into the first electrode of the light-emitting element under the control of a reset control signal to control the light-emitting element not to emit light.

* * * * *